US012705052B2

(12) United States Patent
Grochowski et al.

(10) Patent No.: US 12,705,052 B2
(45) **Date of Patent: *Aug. 11, 2026**

(54) INTERRUPTIBLE AND RESTARTABLE MATRIX MULTIPLICATION INSTRUCTIONS, PROCESSORS, METHODS, AND SYSTEMS

(71) Applicant: Intel Corporation, Santa Clara, CA (US)

(72) Inventors: Edward T. Grochowski, San Jose, CA (US); Asit K. Mishra, Hillsboro, OR (US); Robert Valentine, Kiryat Tivon (IL); Mark J. Charney, Lexington, MA (US); Simon C. Steely, Jr., Hudson, NH (US)

(73) Assignee: Intel Corporation, Santa Clara, CA (US)

( * ) Notice: Subject to any disclaimer, the term of this patent is extended or adjusted under 35 U.S.C. 154(b) by 46 days.

This patent is subject to a terminal disclaimer.

(21) Appl. No.: 19/004,194

(22) Filed: Dec. 27, 2024

(65) Prior Publication Data

US 2025/0138823 A1 May 1, 2025

Related U.S. Application Data

(63) Continuation of application No. 18/240,287, filed on Aug. 30, 2023, now Pat. No. 12,204,898, which is a (Continued)

(51) Int. Cl.
*G06F 9/30* (2018.01)
*G06F 9/38* (2018.01)

(52) U.S. Cl.
CPC ........ *G06F 9/3001* (2013.01); *G06F 9/30036* (2013.01); *G06F 9/3861* (2013.01)

(58) Field of Classification Search
CPC .. G06F 9/3001; G06F 9/30036; G06F 9/3861; G06F 9/3877; G06F 7/5443; G06F 15/8032; G06F 17/16
See application file for complete search history.

(56) References Cited

U.S. PATENT DOCUMENTS 5,247,632 A 9/1993 Newman
5,475,822 A 12/1995 Sibigtroth et al.
(Continued)

FOREIGN PATENT DOCUMENTS

CN 1774709 A 5/2006
CN 101986264 A 3/2011
(Continued)

OTHER PUBLICATIONS

First Office Action, CN App. No. 202111331455.8, May 23, 2025, 11 pages of Original Document only.
(Continued)

*Primary Examiner* — Jyoti Mehta
*Assistant Examiner* — Kasim Alli
(74) *Attorney, Agent, or Firm* — Nicholson De Vos Webster & Elliott LLP

(57) ABSTRACT

A processor of an aspect includes a decode unit to decode a matrix multiplication instruction. The matrix multiplication instruction is to indicate a first memory location of a first source matrix, is to indicate a second memory location of a second source matrix, and is to indicate a third memory location where a result matrix is to be stored. The processor also includes an execution unit coupled with the decode unit. The execution unit, in response to the matrix multiplication instruction, is to multiply a portion of the first and second source matrices prior to an interruption, and store a completion progress indicator in response to the interruption. The completion progress indicator to indicate an amount of
(Continued)

progress in multiplying the first and second source matrices, and storing corresponding result data to the third memory location, that is to have been completed prior to the interruption.

28 Claims, 16 Drawing Sheets

Related U.S. Application Data continuation of application No. 18/220,225, filed on Jul. 10, 2023, now Pat. No. 12,050,912, which is a continuation of application No. 17/362,854, filed on Jun. 29, 2021, now Pat. No. 11,698,787, which is a continuation of application No. 16/398,200, filed on Apr. 29, 2019, now Pat. No. 11,048,508, which is a continuation of application No. 15/201,442, filed on Jul. 2, 2016, now Pat. No. 10,275,243.

(56) References Cited

U.S. PATENT DOCUMENTS 5,475,882 A 12/1995 Sereboff
5,655,096 A 8/1997 Branigin
5,892,962 A 4/1999 Cloutier
6,161,219 A 12/2000 Ramkumar et al.
6,212,112 B1 4/2001 Naura et al.
6,233,596 B1 * 5/2001 Kubota .................. G06F 9/325 708/603
6,332,186 B1 12/2001 Elwood et al.
6,584,482 B1 6/2003 Hansen et al.
6,877,020 B1 4/2005 Bratt et al.
7,003,542 B2 2/2006 Devir
7,209,939 B2 4/2007 Castrapel et al.
7,389,404 B2 6/2008 Nair et al.
7,725,521 B2 5/2010 Chen et al.
7,792,895 B1 9/2010 Juffa et al.
7,873,812 B1 1/2011 Mimar
7,912,889 B1 3/2011 Juffa et al.
7,932,910 B2 4/2011 Hansen et al.
8,392,487 B1 3/2013 Mesh et al.
8,924,455 B1 * 12/2014 Barman ................ G06F 7/5443 708/607
8,984,043 B2 3/2015 Ginzburg et al.
9,442,723 B2 9/2016 Yang et al.
9,600,281 B2 3/2017 Eichenberger et al.
9,906,359 B2 2/2018 Gueron
9,960,907 B2 5/2018 Gueron
10,535,114 B2 1/2020 Bolz
2003/0126176 A1 7/2003 Devir
2004/0111587 A1 6/2004 Nair et al.
2004/0122887 A1 6/2004 Macy
2005/0193050 A1 9/2005 Sazegari
2006/0101245 A1 5/2006 Nair et al.
2006/0190517 A1 8/2006 Guerrero
2007/0157211 A1 * 7/2007 Wang .................... G06F 9/3877 712/E9.035
2007/0186210 A1 8/2007 Hussain et al.
2008/0071851 A1 3/2008 Zohar et al.
2008/0140994 A1 6/2008 Khailany et al.
2008/0208942 A1 8/2008 Won et al.
2008/0222486 A1 9/2008 Richardson et al.
2009/0043836 A1 2/2009 Dupaquis et al.
2009/0292758 A1 11/2009 Brokenshire et al.
2009/0300091 A1 12/2009 Brokenshire et al.
2009/0300249 A1 12/2009 Moyer et al.
2010/0180100 A1 7/2010 Lu et al.
2010/0325187 A1 12/2010 Juffa et al.
2011/0153707 A1 6/2011 Ginzburg et al.
2012/0079252 A1 3/2012 Sprangle
2012/0113133 A1 5/2012 Shpigelblat
2012/0137074 A1 5/2012 Kim et al.
2012/0254588 A1 10/2012 Adrian et al.
2012/0314774 A1 12/2012 Yang et al.
2013/0077873 A1 3/2013 Bar et al.
2013/0305020 A1 11/2013 Valentine et al.
2014/0016774 A1 1/2014 Wolrich et al.
2014/0149480 A1 5/2014 Catanzaro et al.
2014/0195783 A1 7/2014 Karthikeyan et al.
2015/0067302 A1 3/2015 Gueron
2015/0089197 A1 3/2015 Gopal et al.
2015/0138206 A1 5/2015 Mizell
2015/0199266 A1 7/2015 Franchetti et al.
2015/0277904 A1 10/2015 Espasa et al.
2016/0179523 A1 6/2016 Ould-Ahmed-Vall et al.
2017/0178276 A1 6/2017 Akenine-Moller et al.
2017/0337156 A1 11/2017 Yadavalli
2018/0113708 A1 4/2018 Corbal et al.
2023/0409318 A1 12/2023 Grochowski et al.

FOREIGN PATENT DOCUMENTS

CN 103198328 A 7/2013
CN 103236859 A 8/2013
CN 104346318 A 2/2015
CN 104699457 A 6/2015
CN 104951278 A 9/2015
CN 105302522 A 2/2016
CN 109313556 A 2/2019
KR 10-2011-0079495 A 7/2011
TW I322958 B 4/2010
TW 201118721 A 6/2011
TW 201342220 A 10/2013
TW I489380 B 6/2015
TW 201617959 A 5/2016
WO 2004/053841 A2 6/2004
WO 2016/003740 A1 1/2016
WO 2016/105727 A1 6/2016
WO 2018/125250 A1 7/2018

OTHER PUBLICATIONS

Soliman et al., “A shared matrix unit for a chip multi-core processor”, J. Parallel Distrib. Comput., 2013, 11 pages.
Allowance Decision of Examination, TW App. No. 106117444, Feb. 10, 2022, 3 pages (1 page of English Translation and 2 pages of Original Document).
Allowance Decision of Examination, TW App. No. 110139698, Jan. 16, 2023, 3 pages (1 page of English Translation and 2 pages of Original Document).
Benson A.R., A Framework for Practical Parallel Fast Matrix Multiplication, 2015, ACM, pp. 42-53. (Year: 2015).
Corrected Notice of Allowabilily, U.S. Appl. No. 15/201,442, Jan. 22, 2019, 5 pages.
Corrected Notice of Allowability, U.S. Appl. No. 15/201,442, Jan. 22, 2019, 5 pages.
Corrected Notice of Allowability, U.S. Appl. No. 15/201,442, Mar. 11, 2019, 2 pages.
Corrected Notice of Allowabilityfrom U.S. Appl. No. 15/201,442, Mar. 11, 2019, 6 pages.
First Office Action, CN App. No. 201780034999.3, Nov. 28, 2022, 10 pages of Original Document Only.
Guo, J. et. al., Programming with Tiles, 2008, ACM, pp. 111-122. (Year: 2008).
International Preliminary Report on Patentability for Application No. PCT/US2017/036038, Jan. 17, 2019, 14 pages.
International Preliminary Report on Patentability, PCT App. No. PCT/US2017/036038, Jan. 17, 2019, 14 pages.
International Preliminary Report on Patentability, PCT App. No. PCT/US2017/040546, Oct. 3, 2019, 10 pages.
International Search Report and Written Opinion for Application No. PCT/US2017/036038, Sep. 5, 2017 , 15 pages.
International Search Report and Written Opinion, PCT App. No. PCT/US2017/036038, Sep. 5, 2017 , 15 pages.
International Search Report and Written Opinion, PCT App. No. PCT/US2017/040534, Jan. 3, 2018, 11 pages.
International Search Report and Written Opinion, PCT App. No. PCT/US2017/040536, Dec. 20, 2017, 11 pages.

(56) References Cited

OTHER PUBLICATIONS

International Search Report and Written Opinion, PCT App. No. PCT/US2017/040537, Dec. 20, 2017, 11 pages.
International Search Report and Written Opinion, PCT App. No. PCT/US2017/040540, Jan. 3, 2018, 14 pages.
International Search Report and Written Opinion, PCT App. No. PCT/US2017/040546, Jan. 24, 2018, 15 pages.
Lahr D., "Timing Matrix Multiplication in SciDB and Setting the Number of Worker Instances in SciDB and Running Matrix Multiplication Piecemeal," Nov. 13, 2012, 8 pages.
Lahr, David L., "Distractions: Timing Matrix Multiplication in SciDB and Setting the Number of Worker Instances in SciDB and Running Matrix Multiplication Piecemeal", Available Online at <http://dllahr.blogspot.com/2012/11/timing-matrix-multiplication-in-scidb.html>, Nov. 13, 2012, 8 pages.
Liu, S. et al., Campricon: An Instruction Set Architecture for Neural Networks, 2016, IEEE, pp. 393-405. (Year: 2016).
Non-Final Office Action, U.S. Appl. No. 15/201,442, May 4, 2018, 11 pages.
Non-Final Office Action, U.S. Appl. No. 16/398,200, Jul. 28, 2020, 16 pages.
Non-Final Office Action, U.S. Appl. No. 16/398,200, Jul. 28, 2020, 17 pages.
Non-Final Office Action, U.S. Appl. No. 17/362,854, Aug. 25, 2022, 13 pages.
Non-Final Office Action, U.S. Appl. No. 18/240,287, Apr. 25, 2024, 10 pages.
Notice of Allowance, CN App. No. 201780034999.3, Oct. 30, 2023, 04 pages (2 pages of English Translation and 2 pages of Original Document).
Notice of Allowance, U.S. Appl. No. 15/201,442, Dec. 14, 2018, 5 pages.
Notice of Allowance, U.S. Appl. No. 16/398,200, Feb. 24, 2021, 05 pages.
Notice of Allowance, U.S. Appl. No. 17/362,854, Feb. 23, 2023, 11 pages.
Notice of Allowance, U.S. Appl. No. 17/362,854, Mar. 29, 2023, 2 pages.
Notice of Allowance, U.S. Appl. No. 18/220,225, Mar. 18, 2024, 11 pages.
Notice of Allowance, U.S. Appl. No. 18/240,287 Sep. 12, 2024, 11 pages.
Office Action and Search Report, TW App. No. 106117444, Jul. 5, 2021, 13 pages (7 pages of English Translation and 6 pages of Original Document).
Office Action and Search Report, TW App. No. 110139698, Jun. 16, 2022, 13 pages (7 pages of English Translation and 6 pages of Original Document).
Office Action, TW App. No. 112115842, Nov. 27, 2023, 08 pages (04 pages of English Translation and 04 pages of Original Document).
Voronenko et al., "Mechanical Derivation of Fused Multiply-Add Algorithms for Linear Transforms", IEEE Transactions on Signal Processing, vol. 55, No. 9, Sep. 2007, pp. 4458-4473.

* cited by examiner

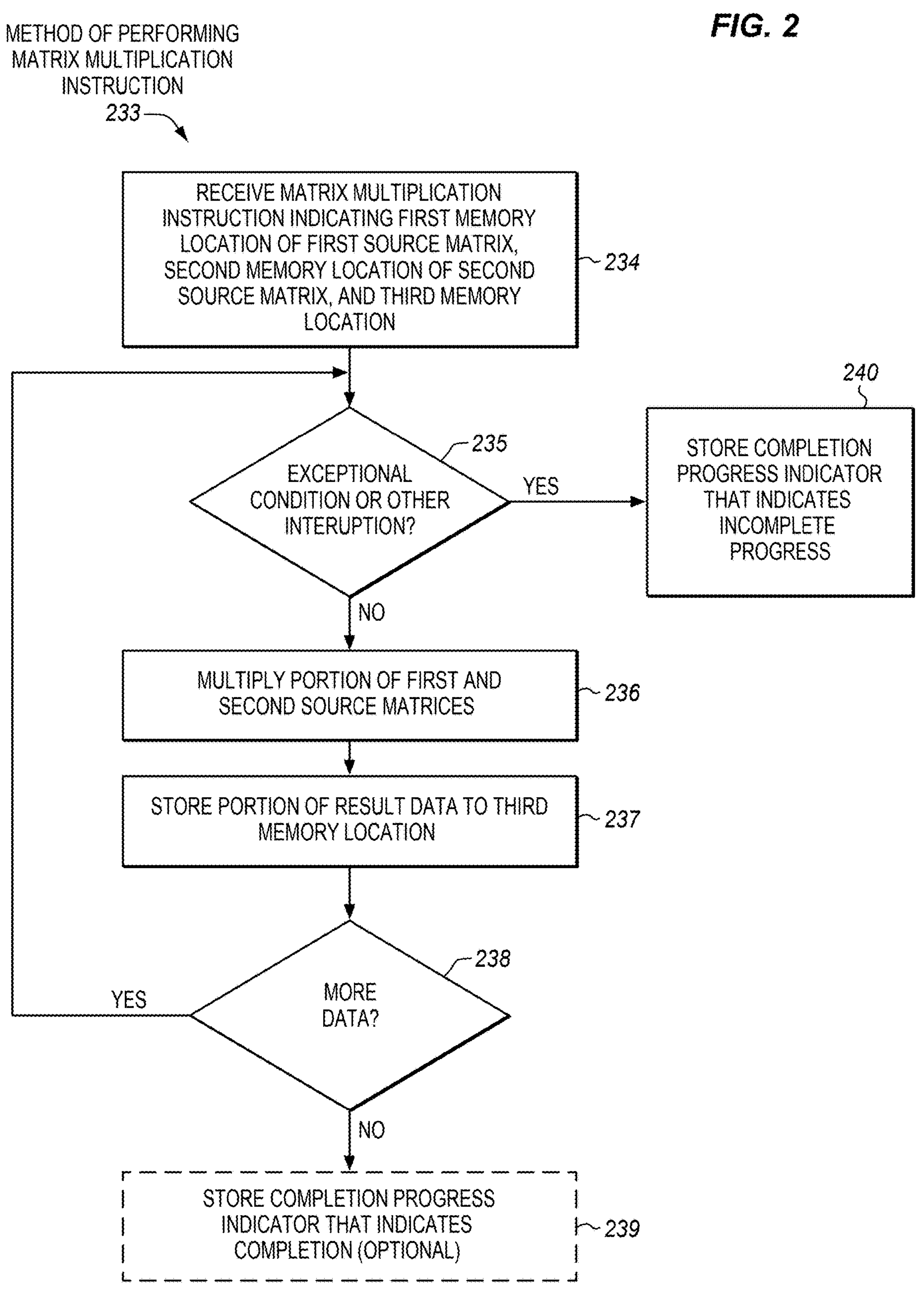
FIG. 2
METHOD OF PERFORMING MATRIX MULTIPLICATION INSTRUCTION
233
RECEIVE MATRIX MULTIPLICATION INSTRUCTION INDICATING FIRST MEMORY LOCATION OF FIRST SOURCE MATRIX, SECOND MEMORY LOCATION OF SECOND SOURCE MATRIX, AND THIRD MEMORY LOCATION
234
EXCEPTIONAL CONDITION OR OTHER INTERUPTION?
235
YES
NO
STORE COMPLETION PROGRESS INDICATOR THAT INDICATES INCOMPLETE PROGRESS
240
MULTIPLY PORTION OF FIRST AND SECOND SOURCE MATRICES
236
STORE PORTION OF RESULT DATA TO THIRD MEMORY LOCATION
237
MORE DATA?
238
YES
NO
STORE COMPLETION PROGRESS INDICATOR THAT INDICATES COMPLETION (OPTIONAL)
239

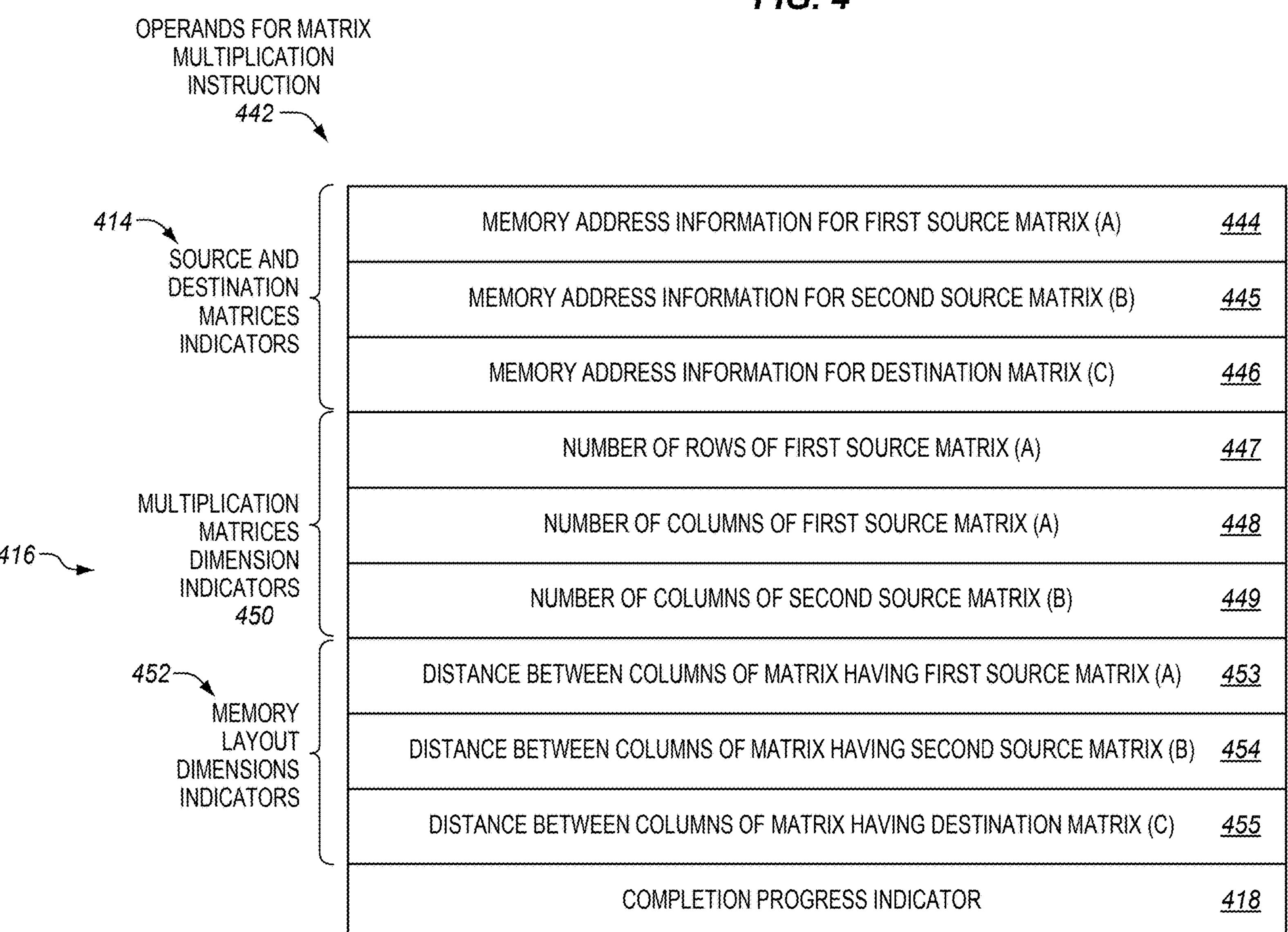
FIG. 4
OPERANDS FOR MATRIX MULTIPLICATION INSTRUCTION
442
414
SOURCE AND DESTINATION MATRICES INDICATORS
416
MULTIPLICATION MATRICES DIMENSION INDICATORS
450
452
MEMORY LAYOUT DIMENSIONS INDICATORS
MEMORY ADDRESS INFORMATION FOR FIRST SOURCE MATRIX (A)
444
MEMORY ADDRESS INFORMATION FOR SECOND SOURCE MATRIX (B)
445
MEMORY ADDRESS INFORMATION FOR DESTINATION MATRIX (C)
446
NUMBER OF ROWS OF FIRST SOURCE MATRIX (A)
447
NUMBER OF COLUMNS OF FIRST SOURCE MATRIX (A)
448
NUMBER OF COLUMNS OF SECOND SOURCE MATRIX (B)
449
DISTANCE BETWEEN COLUMNS OF MATRIX HAVING FIRST SOURCE MATRIX (A)
453
DISTANCE BETWEEN COLUMNS OF MATRIX HAVING SECOND SOURCE MATRIX (B)
454
DISTANCE BETWEEN COLUMNS OF MATRIX HAVING DESTINATION MATRIX (C)
455
COMPLETION PROGRESS INDICATOR
418

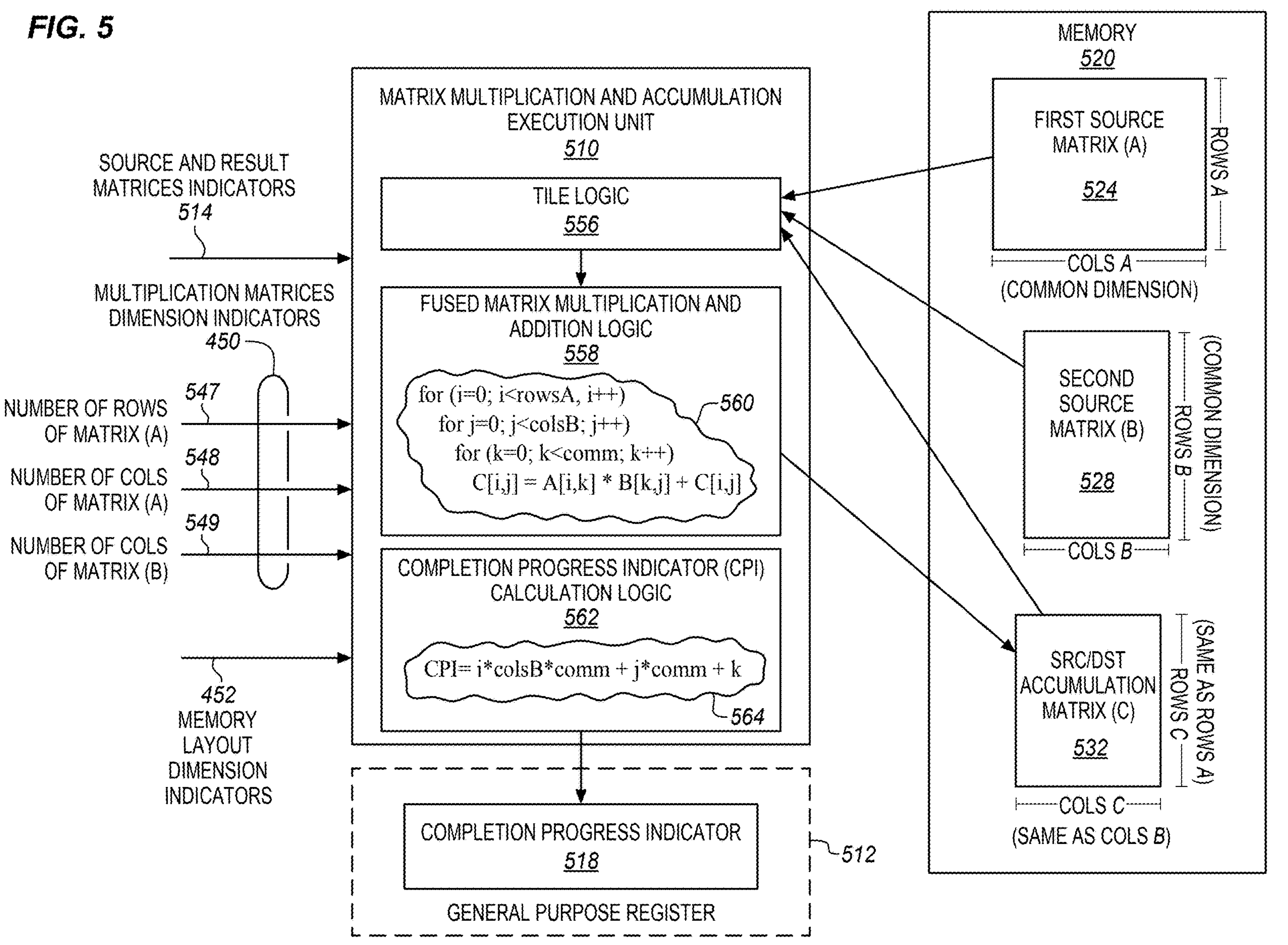
FIG. 5
MATRIX MULTIPLICATION AND ACCUMULATION EXECUTION UNIT
510
TILE LOGIC
556
FUSED MATRIX MULTIPLICATION AND ADDITION LOGIC
558
for (i=0; i<rowsA, i++)
for j=0; j<colsB; j++)
for (k=0; k<comm; k++)
C[i,j] = A[i,k] * B[k,j] + C[i,j]
560
COMPLETION PROGRESS INDICATOR (CPI) CALCULATION LOGIC
562
CPI= i*colsB*comm + j*comm + k
564
COMPLETION PROGRESS INDICATOR
518
GENERAL PURPOSE REGISTER
512
SOURCE AND RESULT MATRICES INDICATORS
514
MULTIPLICATION MATRICES DIMENSION INDICATORS
450
NUMBER OF ROWS OF MATRIX (A)
547
NUMBER OF COLS OF MATRIX (A)
548
NUMBER OF COLS OF MATRIX (B)
549
452
MEMORY LAYOUT DIMENSION INDICATORS
MEMORY
520
FIRST SOURCE MATRIX (A)
524
ROWS A
COLS A
(COMMON DIMENSION)
SECOND SOURCE MATRIX (B)
528
ROWS B
(COMMON DIMENSION)
COLS B
SRC/DST ACCUMULATION MATRIX (C)
532
ROWS C
(SAME AS ROWS A)
COLS C
(SAME AS COLS B)

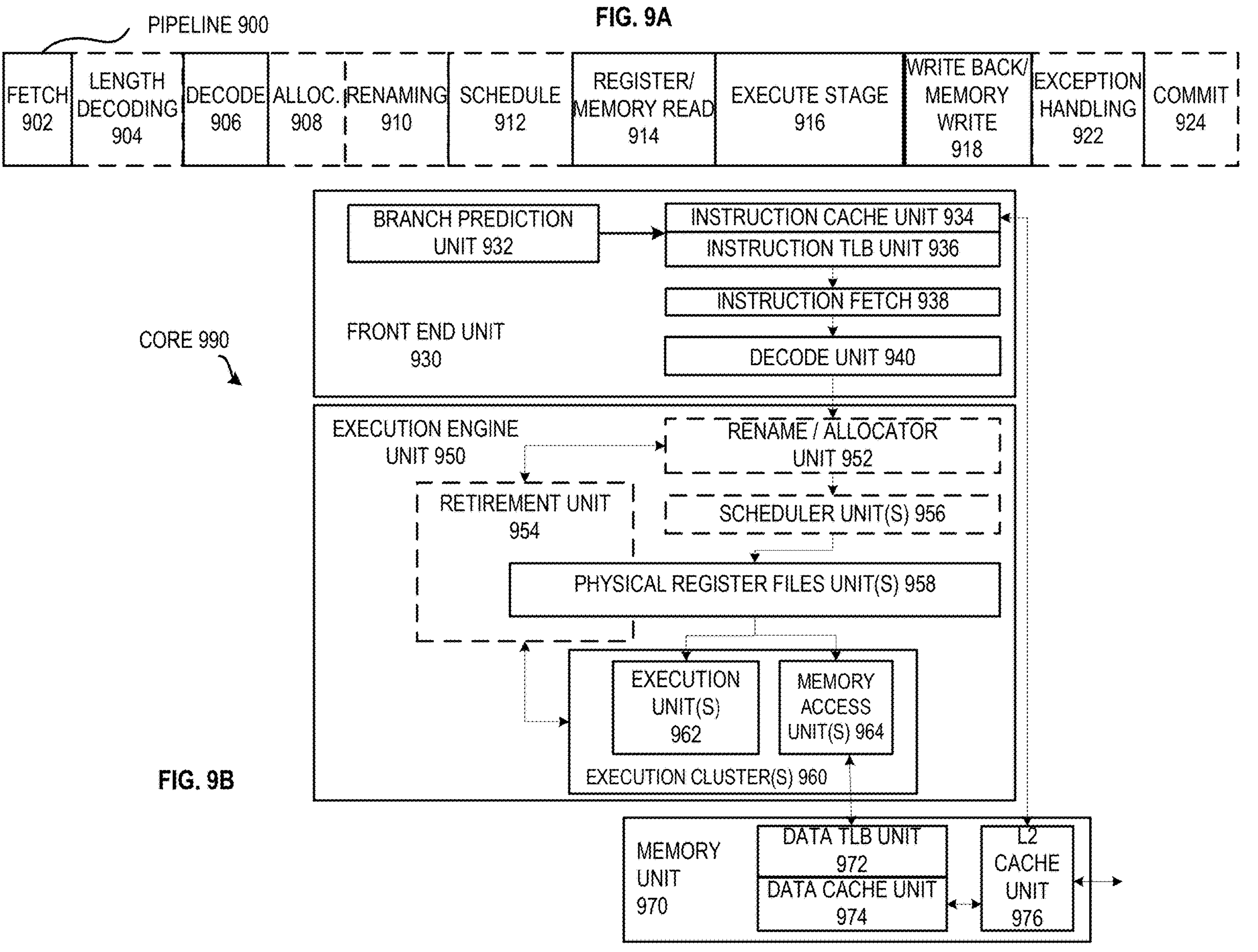
FIG. 9A
PIPELINE 900
FETCH 902
LENGTH DECODING 904
DECODE 906
ALLOC. 908
RENAMING 910
SCHEDULE 912
REGISTER/ MEMORY READ 914
EXECUTE STAGE 916
WRITE BACK/ MEMORY WRITE 918
EXCEPTION HANDLING 922
COMMIT 924
CORE 990
BRANCH PREDICTION UNIT 932
INSTRUCTION CACHE UNIT 934
INSTRUCTION TLB UNIT 936
INSTRUCTION FETCH 938
FRONT END UNIT 930
DECODE UNIT 940
EXECUTION ENGINE UNIT 950
RENAME / ALLOCATOR UNIT 952
RETIREMENT UNIT 954
SCHEDULER UNIT(S) 956
PHYSICAL REGISTER FILES UNIT(S) 958
EXECUTION UNIT(S) 962
MEMORY ACCESS UNIT(S) 964
EXECUTION CLUSTER(S) 960
FIG. 9B
MEMORY UNIT 970
DATA TLB UNIT 972
DATA CACHE UNIT 974
L2 CACHE UNIT 976

INSTRUCTION DECODE 1000
SCALAR UNIT 1008
VECTOR UNIT 1010
SCALAR REGISTERS 1012
VECTOR REGISTERS 1014
L1 CACHE 1006
LOCAL SUBSET OF THE L2 CACHE 1004
RING NETWORK 1002

INTERRUPTIBLE AND RESTARTABLE MATRIX MULTIPLICATION INSTRUCTIONS, PROCESSORS, METHODS, AND SYSTEMS

CROSS-REFERENCE TO RELATED APPLICATIONS

The present patent application is a continuation application claiming priority from U.S. patent application Ser. No. 18/240,287, filed Aug. 30, 2023, titled "INTERRUPTIBLE AND RESTARTABLE MATRIX MULTIPLICATION INSTRUCTIONS, PROCESSORS, METHODS, AND SYSTEMS", which is a continuation application of U.S. patent application Ser. No. 18/220,225, filed Jul. 10, 2023, titled "INTERRUPTIBLE AND RESTARTABLE MATRIX MULTIPLICATION INSTRUCTIONS, PROCESSORS, METHODS, AND SYSTEMS", now U.S. Pat. No. 12,050,912, issued, Jul. 30, 2024, which is a continuation application of U.S. patent application Ser. No. 17/362,854, filed Jun. 29, 2021 titled "INTERRUPTIBLE AND RESTARTABLE MATRIX MULTIPLICATION INSTRUCTIONS, PROCESSORS, METHODS, AND SYSTEMS", now U.S. Pat. No. 11,698,787, issued Jul. 11, 2023, which is a continuation application claiming priority from U.S. patent application Ser. No. 16/398,200, filed Apr. 29, 2019, titled "INTERRUPTIBLE AND RESTARTABLE MATRIX MULTIPLICATION INSTRUCTIONS, PROCESSORS, METHODS, AND SYSTEMS", now U.S. Pat. No. 11,048,508, issued Jun. 29, 2021, which is a continuation of U.S. patent application Ser. No. 15/201,442, filed Jul. 2, 2016, titled "INTERRUPTIBLE AND RESTARTABLE MATRIX MULTIPLICATION INSTRUCTIONS, PROCESSORS, METHODS, AND SYSTEMS", now U.S. Pat. No. 10,275,243, issued Apr. 30, 2019, which is incorporated herein by reference in its entirety.

BACKGROUND

Technical Field

Embodiments described herein generally relate to processors. In particular, embodiments described herein generally relate to matrix multiplication in processors.

Background Information

Many processors have Single Instruction, Multiple Data (SIMD) architectures. Such processors may have instruction sets that include various different types of packed data instructions. The packed data instructions may be used to operate on multiple packed data elements, or multiple pairs of packed data elements, simultaneously and/or in parallel. Multiple data elements may be packed within one register or memory location as packed data, in which the bits of the register or memory location are logically divided into a sequence of data elements. The processor may have parallel execution hardware, responsive to the packed data instructions, to operate on the multiple packed data elements simultaneously and/or in parallel.

One specific example of such an instruction is a packed data multiplication instruction. Another specific example is a packed data multiplication and accumulation instruction. These instructions may be utilized in various different types of algorithms including matrix multiplication. As compared to scalar instructions, which commonly only operate on a single data element, or single pair of data elements, such packed data or SIMD instructions generally tend to help to improve the performance of the various algorithms in which they are used, through the SIMD data parallelism they provide.

BRIEF DESCRIPTION OF THE DRAWINGS

The invention may best be understood by referring to the following description and accompanying drawings that are used to illustrate embodiments. In the drawings:

FIG. 2 is a block flow diagram of an embodiment of a method of performing an embodiment of a matrix multiplication instruction.

FIG. 4 is a block diagram of a second example embodiment of a suitable set of operands for a matrix multiplication instruction.

FIG. 5 is a block diagram of a detailed example embodiment of a matrix multiplication and accumulation execution unit that may be used to execute or perform a matrix multiplication instruction.

FIG. 9A is a block diagram illustrating an embodiment of an in-order pipeline and an embodiment of a register renaming out-of-order issue/execution pipeline.

FIG. 9B is a block diagram of an embodiment of processor core including a front end unit coupled to an execution engine unit and both coupled to a memory unit.

DETAILED DESCRIPTION OF EMBODIMENTS

Disclosed herein are embodiments of matrix multiplication instructions, embodiments of processors to perform the instructions, embodiments of methods performed by the processors when performing the instructions, embodiments of systems incorporating one or more processors to perform the instructions, and embodiments of machine-readable mediums storing or otherwise providing the instructions. In some embodiments, the processors may have a decode unit or other logic to receive and/or decode the instructions, and an execution unit or other logic to perform the instructions. In the following description, numerous specific details are set forth (e.g., specific instruction operations, instruction parameters, data formats, ways of specifying matrixes, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
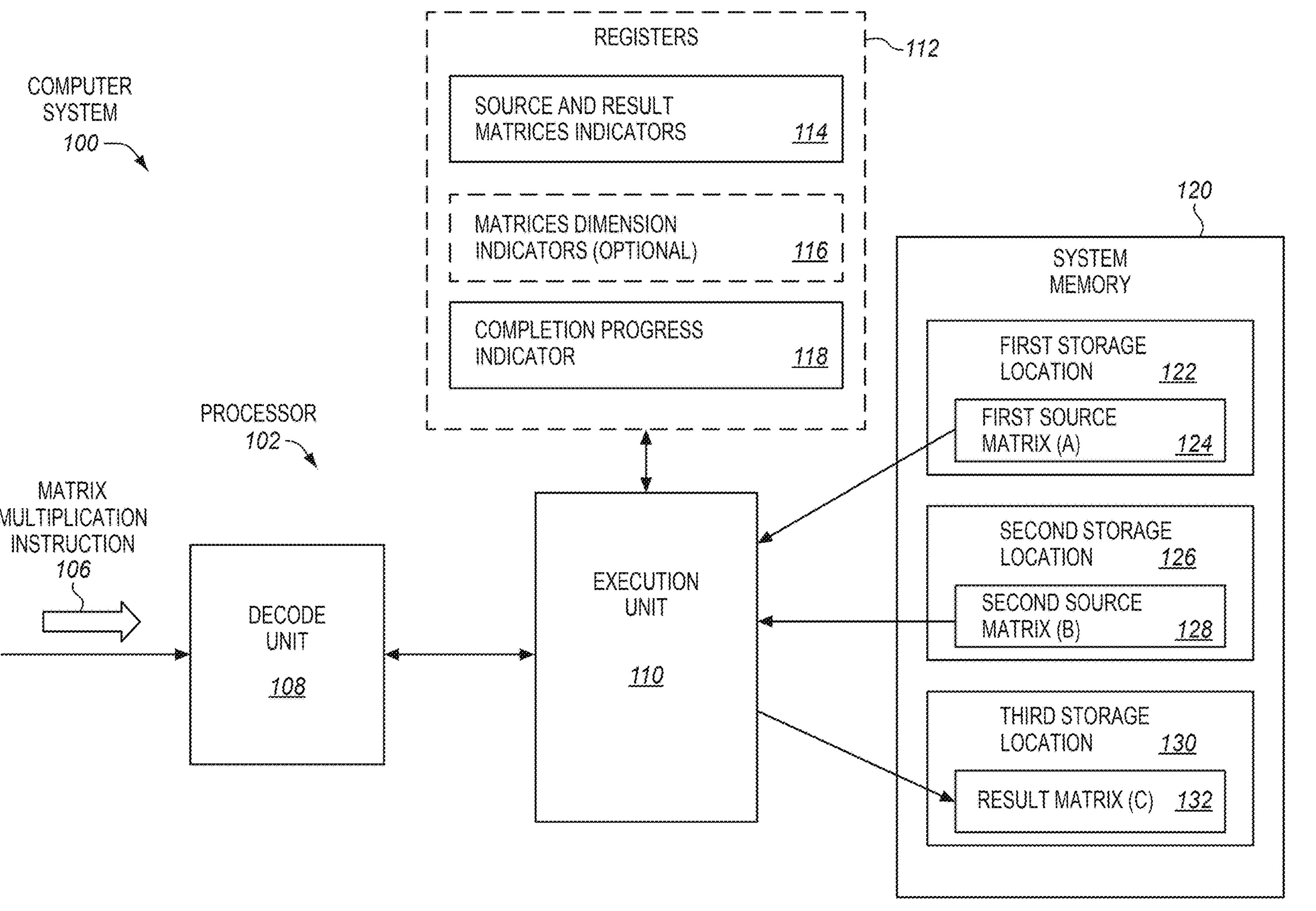
FIG. 1 is a block diagram of an embodiment of a computer system.

FIG. 1 is a block diagram of an embodiment of a computer system 100. In various embodiments, the computer system may represent a desktop computer, a laptop computer, a notebook computer, a workstation, a server, or other computer system. The computer system includes a processor 102 and a system memory 120. The processor and the system memory may be coupled with one another, or otherwise in communication with one another, by a conventional coupling mechanism (e.g., through one or more buses, hubs, memory controllers, chipset components, or the like). The system memory may include one or more different memory devices and/or one or more different types of memory.

The processor 102, in some embodiments, may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, co-processors, and digital signal processors (DSPs). In some embodiments, the processor may be disposed on at least one integrated circuit or semiconductor die. In some embodiments, the processor may include at least some hardware (e.g., transistors, capacitors, diodes, circuitry, non-volatile memory storing microcode, or the like).

During operation, the processor 102 may receive the matrix multiplication instruction 106. For example, the instruction may be fetched or otherwise received from the system memory over a bus or other interconnect. The instruction may represent a macroinstruction, machine code instruction, machine language instruction, or other instruction or control signal of an instruction set of the processor. In some embodiments, the matrix multiplication instruction may be a matrix multiplication instruction that does not also perform matrix accumulation. In other embodiments, the matrix multiplication instruction may be a matrix multiplication instruction that does also perform matrix accumulation with an accumulation matrix. Unless specified otherwise, the term matrix multiplication instruction is used broadly/generically herein to refer to either of these varieties.

The instruction 106 may specify (e.g., explicitly specify) or otherwise indicate (e.g., implicitly indicate) a first storage location 122 where a first source matrix (A) 124 is stored, may specify or otherwise indicate a second storage location 126 where a second source matrix (B) 128 is stored, and may specify or otherwise indicate a third storage location 130 where a result matrix (C) 132 is to be stored in response to the instruction. As shown, in some embodiments, each of the first, second, and third storage locations may optionally be in the system memory 120.

The first, second, and third storage locations 122, 126, 130 may be indicated in different ways in different embodiments. By way of example, in some embodiments, the instruction 106 may provide first and second source and result matrices indicators 114. For example, in the case of the storage locations being in the system memory, these indicators may represent memory pointers or other memory address information. Different types of memory address information are suitable for different types of addressing modes which may be used. Depending upon the particular addressing mode, in some embodiments, such memory address information from the indicators 114 may be combined with other memory address information (e.g., in a data segment register, extended segment register, or other register, or in the encoding of the instruction, or elsewhere) in order to obtain the memory address that is used to access the system memory.

As shown, in some embodiments, these indicators 114 may optionally be stored in a set of registers 112 (e.g., general-purpose registers or scalar registers) of the processor. Each of the registers may represent an on-die (or on integrated circuit) storage location that is operative to store data. The registers may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). The registers may be implemented in different ways in different microarchitectures and are not limited to any particular type of design. Examples of suitable types of registers include, but are not limited to, dedicated physical registers, dynamically allocated physical registers using register renaming, and combinations thereof.

In some cases, the instruction 106 may optionally explicitly specify one or more of the registers 112 storing one or more of the indicators 114. For example, the instruction may optionally have one or more source and/or destination operand specification fields (e.g., contiguous or non-contiguous bits in the instruction encoding) that are each operative to specify one of the registers. As another example, one or more of the registers 112 storing one or more of the indicators 114 may optionally be implicit to the instruction (e.g., implicit to an opcode of the instruction). For example, the processor may implicitly or inherently understand to look in these implicit registers, when it recognizes this instruction (e.g., when it decodes the opcode), without the instruction needing to have any non-opcode bits to explicitly specify the registers. Alternatively, one or more of these indicators 114 may optionally be stored in another storage location.

In some embodiments, the instruction may also optionally provide one or more matrices dimension indicators 116, although this is not required. The matrices dimension indicators 116 may specify or otherwise indicate dimensions (e.g., a number of rows, a number of columns, a dimensionality, or an order) associated with the first source matrix (A) 124, the second source matrix (B) 128, and in some cases optionally the result matrix (C) 132. As one specific example, there may be three different matrices dimension indicators to specify or otherwise indicate three different dimensions associated with the first source matrix (A) and the second source matrix (B). As will be explained further below, the full dimensionality of the first and second source matrices to be multiplied, as well as the result matrix (C), may be fully specified through only three different dimensions (e.g., since in matrix multiplication one dimension of the source matrices is the same, and the dimensions of the result matrix (C) depend on those of the source matrices). Advantageously, the matrices dimension indicators may allow the instruction to be used to operate on flexible and/or arbitrary sized matrices, the dimensions of which may be provided through the matrices dimension indicators. A wide range of different sized matrices may be specified. Also, the sizes of the matrices may range from relatively small, to potentially extremely large, such as, for example, matrices that may be multiplied in times that range from less than a second to many hours, days, weeks, a month, or more, when multiplied on state of the art general-purpose microprocessors of the type widely used in present day computers.

Alternatively, instead of supporting fully flexible and/or arbitrary sized matrices, one or more sets of predetermined and/or fixed sized matrices may optionally be supported. In such a case, a single indicator 116 may optionally be used to select any one of a number of such sets of predetermined and/or fixed sized matrices. By way of example, two, three, four, eight, sixteen, or some other number, of different predetermined and/or fixed sized matrices may optionally be supported. As another option, only a single set of predetermined and/or fixed sized matrices dimensions may optionally be supported, and may optionally be fixed or implicit to the instruction (e.g., for an opcode thereof). In such a case, the matrices dimension indicators 116 may optionally be omitted entirely. For such embodiments, a software algorithm may partition a larger matrix into the set of smaller fixed sized matrices for the instruction, and the software algorithm may be responsible for merging the results together. Using such a set of predetermined and/or fixed sized matrices may help to simplify the implementation and/or may allow optimization of the execution logic, although this may also tend to reduce the flexibility of the instruction.

Referring again to FIG. 1, the processor includes a decode unit or decoder 108. The decode unit may receive and decode the matrix multiplication instruction. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level matrix multiplication instruction. In some embodiments, the decode unit may include one or more input structures (e.g., port(s), interconnect(s), an interface) to receive the matrix multiplication instruction, an instruction recognition and decode logic coupled therewith to recognize and decode the matrix multiplication instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms suitable to implement decode units. In some embodiments, the decode unit may be included on a die (e.g., on die with the execution unit 110). In some embodiments, the decode unit may include at least some hardware (e.g., transistors, integrated circuitry, or on-die firmware, etc.).

In some embodiments, instead of the matrix multiplication instruction being provided directly to the decode unit, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the matrix multiplication instruction, which may be of a first instruction set, and may emulate, translate, morph, interpret, or otherwise convert the matrix multiplication instruction into one or more corresponding intermediate instructions or control signals, which may be of a second different instruction set. The one or more intermediate instructions or control signals of the second instruction set may be provided to a decode unit (e.g., decode unit 108), which may decode them into one or more lower-level instructions or control signals executable by native hardware of the processor (e.g., one or more execution units).

Referring again to FIG. 1, the execution unit 110 is coupled with the decode unit 108 and the registers 112. In some embodiments, the execution unit may be on a die or integrated circuit (e.g., on die or integrated circuit with the decode unit). The execution unit may receive the one or more decoded or otherwise converted instructions or control signals that represent and/or are derived from the matrix multiplication instruction 106. During deployment and use, the execution unit may also be operative to be coupled with the system memory 120. The execution unit may also receive as inputs the first source matrix (A) 124 and the second source matrix (B) 128. In embodiments in which the matrix multiplication instruction is also to perform accumulation, the execution unit may also an accumulation matrix stored in the third storage location 130 where the result matrix (C) 132 is to be stored. In such a case, the third storage location may be used as a source/destination operand of the instruction in that it may initially be used as a source operand for the accumulation matrix, and subsequently be used as a destination operand for the result matrix (C) 132.

The execution unit 110 may be operative in response to and/or as a result of the matrix multiplication instruction 106 (e.g., in response to one or more instructions or control signals decoded from the instruction and/or in response to the instruction being decoded and/or in response to the instruction being provided to a decoder) to store the result matrix (C) 132 in the third or destination storage location 130 indicated by the instruction. In some embodiments, where the matrix multiplication instruction does not perform accumulation, the result matrix (C) 132 may represent a matrix multiplication product of the first source matrix (A) 124 and the second source matrix (B) 128. Matrix multiplication involves multiplying two input matrices to produce another output matrix. In other embodiments, where the matrix multiplication instruction does not perform accumulation, an additional accumulation matrix may be added to the matrix multiplication product, and the result matrix (C) 132 may represent the multiplication product of the first source matrix (A) 124 and the second source matrix (B) 128 added to the accumulation matrix. Commonly, the accumulation matrix may be a matrix initially stored in the third storage location 130 (where the result matrix (C) is subsequently to be stored) right before the matrix multiplication instruction is performed, and when the matrix multiplication instruction completes the result matrix (C) may be stored over the accumulation matrix (and possibly become the accumulation matrix for another matrix multiplication instruction).

In some embodiments, different opcodes may optionally be provided for a matrix multiplication with matrix accumulation instruction, and a matrix multiplication without matrix accumulation instruction. In other embodiments, a same opcode may optionally be used for both varieties, and the instruction may have one or more bits or a field to indicate whether the instruction is to be performed with or without matrix accumulation. For example, a single bit may have a first value (e.g., binary zero) to indicate that the instruction is to be performed without matrix accumulation, or a second value (e.g., binary one) to indicate that the instruction is to be performed with matrix accumulation. The opposite binary convention is also suitable. At least conceptually, this bit may represent a coefficient that may be multiplied by the accumulation matrix to either cause accumulation (e.g., in the case of the bit being binary one) or not cause accumulation (e.g., in the case of the bit being binary zero), although such multiplication may not actually be performed in practice.

As discussed above, in some embodiments, the sizes of the first source matrix (A) 124, and the second source matrix (B) 128, may optionally be allowed to be flexible or arbitrary. Also, in some embodiments, the first source matrix (A), the second source matrix (B), and the result matrix (C) may all potentially/optionally be large, or even extremely large. Depending largely upon the size of the matrices, the time needed for the instruction to complete may range from a relatively short period of time (e.g., on the order of seconds to minutes), to long or even extremely long periods of time (e.g., on the order of from many hours to a month or more) when performed on state of the art general-purpose microprocessors of the type widely used in present day computers, although the scope of the invention is not limited to any particular amount of time.

Especially when the completion times are relatively long, it is possible that a fault, exception, interrupt, trap, or other exceptional condition, or other interruption, may occur before the matrix multiplication instruction completes. As used herein, "exceptional condition" refers broadly to various different types of faults, exceptions, traps, aborts, and the like, which may stop or interrupt the performance of the matrix multiplication instruction. As used herein, "interruption" refers broadly to these types of exceptional conditions, as well as possibly other types of events or conditions, which may stop or otherwise interrupt the performance of the matrix multiplication instruction. By way of example, in the case of an exception being detected (e.g., in response to a privilege violation, page fault, memory protection fault, or the like), the performance of the matrix multiplication instruction may be stopped, and an automatically generated control flow transfer may be made to a handler routine (e.g., a module of an operating system).

In some embodiments, to help allow for the possibility of such exceptional conditions or other interruptions, the matrix multiplication instruction 106 may be operative to be interruptible and/or restartable. In some embodiments, the matrix multiplication instruction, if an interruption is encountered before the matrix multiplication instruction completes and commits, may be operative to cause the execution unit 110 and/or the processor 102 to store a completion progress indicator 118. The completion progress indicator may broadly represent any of various different types of values that may be used to indicate (e.g., to the execution unit and/or the processor) how much progress has been made in performing the matrix multiplication instruction and/or the level or amount of work that has been achieved toward completion of the matrix multiplication instruction, at or around the time of an interruption. This amount may be expressed in different ways in different embodiments. For example, the completion progress indicator may indicate the amount of progress in multiplying the first and second source matrices that is to have been completed as the amount of multiplication that has been performed and/or the amount of result data based on such multiplication that has been stored to memory. By way of example, the completion progress indicator may represent any one or more of a value that is incremented or otherwise updated as calculations are performed, an evaluation of an equation that reflects completion progress, an estimate of a level of progress or completion, or another value or data, which may be operative to indicate completion progress. While the matrix multiplication is being performed, the completion progress indicator may represent a destination operand of the matrix multiplication instruction that may be stored when the matrix multiplication stops before completion (e.g., due to an exception or other interruption). Subsequently, when the matrix multiplication instruction is resumed or restarted, the completion process indicator may represent a source operand of the matrix multiplication instruction that may be read and used to restart or resume the calculations. In some embodiments, the calculations may be resumed at a point that is based on and/or dependent on the completion progress indicator.

In one example embodiment, the completion progress indicator 118 may be initialized to a starting value prior to performance of the matrix multiplication instruction. The completion progress indicator may be changed or adjusted (e.g., substantially continually or at discrete points of time) as matrix multiplication calculations are performed by the instruction. If the matrix multiplication instruction is performed fully to completion, the completion progress indicator may have a final or stopping value. Upon such a successful completion, the matrix multiplication instruction may be allowed to retire or otherwise complete, and the instruction pointer may be allowed to advance to the next instruction to be performed. However, if at any intermediate point between the starting and stopping values of the completion progress indicator, an interruption occurs, the current intermediate value of the completion progress indicator (e.g., somewhere between the starting and stopping values) may be stored. Later, when the matrix multiplication instruction is resumed, the completion progress indicator may be retrieved and used to restart calculations where they left off. In some cases, the starting value may be zero, and the completion progress indicator may be increased as calculations are performed. In other cases, the starting value may be a value indicating the total amount of progress to make and/or work to perform, and the completion progress indicator may be decreased as calculations are performed.

As shown, in some embodiments, the completion progress indicator 118 may optionally be stored in one of the registers 112. The matrix multiplication 106 may specify (e.g., explicitly specify through one or more bits or a field of the instruction), or otherwise indicate (e.g., implicitly indicate), such a register. Alternatively, the completion progress indicator may optionally be stored in the system memory, or in another storage location.

In some embodiments, if such an interruption occurs, intermediate or incomplete calculation results may also be stored. Commonly, such results may be stored in the system memory 120 (e.g., in the result matrix (C) 132). When the instruction is later resumed, these intermediate or incomplete calculation results may be received, and used to restart the calculations where they left off.

The execution unit 110 and/or the processor 102 may include specific or particular logic (e.g., transistors, integrated circuitry, or other hardware and/or firmware (e.g., instructions stored in non-volatile memory) and/or software) that is operative to perform the matrix multiplication instruction and/or store the result in response to and/or as a result of the matrix multiplication instruction (e.g., in response to one or more instructions or control signals decoded from the matrix multiplication instruction). In some embodiments, the execution unit may include at least some hardware, and may include predominantly hardware and/or firmware potentially combined with some software. In some embodiments, the execution unit may include a two dimensional array of fused multiplier-adder circuits. Various different relative amounts of circuitry or other hardware and/or microcode or firmware may be used (e.g., depending upon the particular cost and performance objectives of the particular implementation. For example, relatively more hardware may be used to help provide a relatively higher-performance approach, or relatively more firmware may be used to help provide a relatively lower cost approach.

Advantageously, the matrix multiplication instruction may help to provide relatively high levels of arithmetic processing within the confines of the execution of a single instruction. Even as compared to current wide SIMD instructions, the matrix multiplication instruction may generally provide significantly more arithmetic operations. This may help to amortize the associated energy costs of fetching and decoding the instruction, and retrieving and storing data, over a significantly larger number of arithmetic operations. This in turn may help to reduce the energy consumption per unit of arithmetic processing. In addition, in some embodiments, the matrix multiplication instruction may be interruptible and/or restartable. For example, the completion progress indicator 118 and intermediate or incomplete calculation results may be stored when the instruction is stopped (e.g., due to an exception or other exceptional condition or other interruption). This may help to ensure continued forward progress in the face of possible interruptions, and may tend to be especially advantageous for long or extremely long completion times of the matrix multiplication instruction.

To avoid obscuring the description, a relatively simple processor 102 has been shown and described. However, the processor may optionally include other processor components. For example, various different embodiments may include various different combinations and configurations of the components shown and described for any of FIGS. 9-11. All of the components of the processor may be coupled together to allow them to operate as intended. By way of example, considering FIG. 9B, the instruction cache 934 may cache the instructions, the instruction fetch unit 938 may fetch the instruction, the decode unit 940 may decode the instruction, the scheduler unit 956 may schedule the associated operations, the execution unit 962 may perform the instruction, the retirement unit 954 may retire the instruction, etc.

FIG. 2 is a block flow diagram of an embodiment of a method 233 of performing an embodiment of a matrix multiplication instruction. In various embodiments, the method may be performed by a processor, instruction processing apparatus, digital logic device, or integrated circuit. In some embodiments, the method 233 may be performed by and/or with the processor 102 and/or using the matrix multiplication instruction 106 of FIG. 1. The components, features, and specific optional details described herein for the processor 102 and/or the matrix multiplication instruction 106 also optionally apply to the method 233. Alternatively, the method 233 may be performed by and/or within a similar or different processor or apparatus and/or using a similar or different matrix multiplication instruction. Moreover, the processor 102 may perform methods similar to or different than the method 233.

The method includes receiving the matrix multiplication instruction, at block 234. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.). In some embodiments, the matrix multiplication instruction may specify or otherwise indicate a first memory location of a first source matrix, a second memory location of a second source matrix, and a third memory location where a result matrix is to be stored.

At block 235, a determination may be made whether an exception, page fault, other exceptional condition, or other interruption has occurred. By way of example, if portions of the memory operands to be operated on are not accessible, for example in the case of a page fault, the instruction may be interrupted. If no such interruption has occurred (i.e., “no” is the determination), the method may advance to block 236.

At block 236, a portion of the first and second source matrices may be multiplied. At block 237, a portion of result data may be stored to the third memory location. In the case of no accumulation, this may represent a product of multiplying the portions of the first and second source matrices. In the case of accumulation, the portion of result data may represent a portion of accumulation data added to such a product.

At block 238, a determination may be made whether more data is to be processed. If there is more data to be processed (i.e., “yes” is the determination), the method may revisit block 235. More data may be retrieved, assuming there is no page fault or other interruption, and the additional data may be processed.

Alternatively, if at block 238 the determination is that there is not more data to be processed (i.e., “no” is the determination), the method may advance to optional block 239. At optional block 239, a completion progress indicator that indicates full completion of the matrix multiplication instruction may optionally be stored (e.g., in a register or other architecturally visible storage location).

Referring again to block 235, if at some point the determination is that an interruption has occurred at block 235 (i.e., “yes” is the determination), the method may advance to block 240. At block 240, a completion progress indicator that indicates incomplete progress may be stored (e.g., in a register or other architecturally visible storage location). The completion progress indicator may be similar to, or the same as, those described elsewhere herein. For example, the completion progress indicator may indicate an amount of progress in multiplying the first and second source matrices, and storing corresponding result data to the third memory location, that is to have been completed prior to the interruption.

The illustrated method involves architectural operations (e.g., those visible from a software perspective). In other embodiments, the method may optionally include one or more microarchitectural operations. By way of example, the instruction may be fetched, decoded, source matrices may be accessed, an execution unit may perform microarchitectural operations to implement the instruction, etc. In some embodiments, the method may also optionally include breaking the matrix operands into relatively smaller portions (e.g., tiles or blocks). In some embodiments, the method may also optionally include managing the relatively smaller portions (e.g., tiles or blocks) within one or more caches. In some embodiments, the method may also optionally include prefetching source matrix data. In some embodiments, the method may also optionally include performing a relatively "slower" path involving individual data element-by-data element multiplication for a partial tile and/or after an interruption as opposed to a relatively "faster" path used for complete tiles and/or when no interruption has been detected for the complete tiles.

Figure 3:
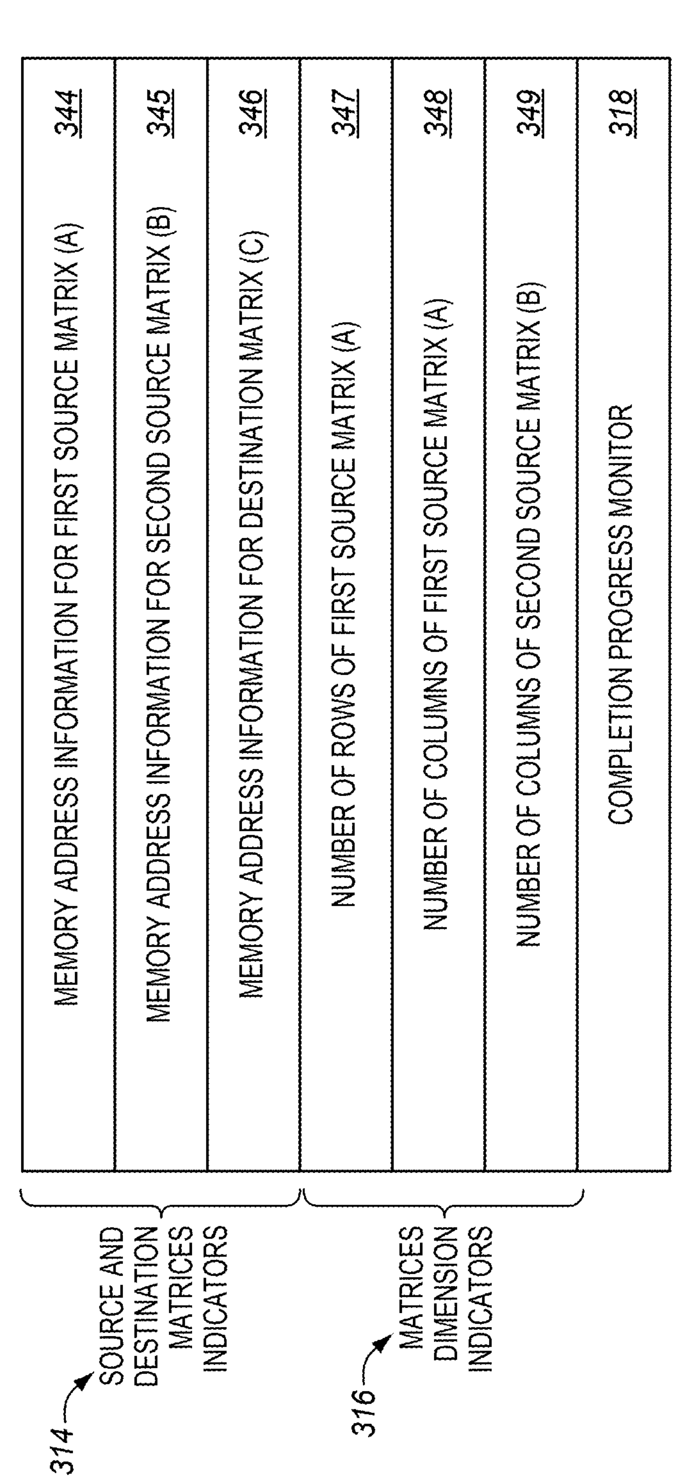
FIG. 3 is a block diagram of a first example embodiment of a suitable set of operands for a matrix multiplication instruction.

FIG. 3 is a block diagram of a first example embodiment of a suitable set of operands 342 for a matrix multiplication instruction (e.g. the matrix multiplication instruction 106). The operands include a set of source and destination matrices indicators 314. In the illustrated embodiment, these indicators include memory address information 344 for a first source matrix (A), memory address information 345 for a second source matrix (B), and memory address information 346 for a destination matrix (C), which in some embodiments may be a source/destination matrix (e.g., initially used as an accumulation matrix).

The operands also include matrices dimension indicators 316. In the illustrated embodiment, these indicators include a number of rows of the first source matrix (A) 347, a number of columns of the first source matrix (A) 348, and a number of columns of the second source matrix (B) 349. In other embodiments, other combinations of dimensions may optionally be used to specify the dimensions of the matrices, as described elsewhere herein. Advantageously, including these matrices dimension indicators may allow the matrix multiplication instruction to be used to process various different sized and/or arbitrarily sized matrices.

The operands also include a completion progress indicator 318. The completion progress indicator may be used as a destination operand for an in-progress matrix multiplication instruction that gets interrupted and/or as a source operand for a matrix multiplication instruction that is being resumed or restarted.

FIG. 4 is a block diagram of a second example embodiment of a suitable set of operands 442 for a matrix multiplication instruction (e.g. the matrix multiplication instruction 106). The operands include a set of source and destination matrices indicators 414. In the illustrated embodiment, these indicators include memory address information 444 for a first source matrix (A), memory address information 445 for a second source matrix (B), and memory address information 446 for a destination matrix (C), which in some embodiments may be a source/destination matrix.

The operands also include matrices dimension indicators 416. In this example embodiment, the matrices dimension indicators 416 include a set of multiplication matrices dimension indicators 450 and a set of memory layout dimension indicators 452. The multiplication matrices dimension indicators 450 include a number of rows of the first source matrix (A) 447, a number of columns of the first source matrix (A) 448, and a number of columns of the second source matrix (B) 449. In other embodiments, other combinations of dimensions may optionally be used to specify the dimensions of the matrices, as described elsewhere herein.

The operands also include memory layout dimensions indicators 452. These indicators may be used to indicate the dimensions of potentially/optionally larger matrices which contain the matrices to be multiplied (e.g., the matrices dimensioned according to the multiplication matrices dimension indictors 450) as they are laid out or stored in memory. As one example, the multiplication matrices dimension indicators 450 may correspond to only a tile, block, or other portion of larger matrices corresponding to the memory layout dimension indicators 452. As another example, the larger matrices corresponding to the memory layout dimension indicators 452 may include padding (e.g., zero padding), such as, for example, to help achieve alignment with cache line boundaries, etc. A combination of these is also possible. Also, the memory layout dimensions indicators may either be in column major format or row major format, in different embodiments. For example, when in a column major format, the memory layout dimensions may include a distance (e.g., in 8-bit bytes or 16-bit words) between columns 453 of the optionally/potentially larger matrix having the first source matrix (A), a distance between columns 454 of the optionally/potentially larger matrix having the second source matrix (B), and a distance between columns 455 of the optionally/potentially larger matrix having the destination matrix (C). Alternatively, when in a row major format, the memory layout dimensions may include a distance between rows of the optionally/potentially larger matrix having the first source matrix (A), a distance between rows of the optionally/potentially larger matrix having the second source matrix (B), and a distance between rows of the optionally/potentially larger matrix having the destination matrix (C).

The operands also include a completion progress indicator. The completion progress indicator may be used as a destination for an in-progress matrix multiplication instruction that gets interrupted, and a source operand for a matrix multiplication instruction when it is restarted.

The operands 342, 442 may be provided in different ways in different embodiments. As one example, each of these operands may optionally be stored in a different register (e.g., 32-bit or 64-bit general-purpose register) that is specified or otherwise indicated by the matrix multiplication instruction. Alternatively, memory locations or other storage locations may optionally be used. As another option, the matrices dimension indicators 316 and/or the multiplication matrices dimension indicators 450 and/or the memory layout dimensions indicators 452 may optionally be provided within the encoding of the matrix multiplication instruction (e.g., in an immediate). As one concrete illustrative example, a 32-bit immediate may optionally be used, and bits [9:0] may be used to specify a first dimension, bits [20:10] may be used to specify a second dimension, and bits [31:21] may be used to specify a third dimension.

FIG. 5 is a block diagram of a detailed example embodiment of a matrix multiplication and accumulation execution unit 510 that may be used to execute or perform a matrix multiplication instruction (e.g., the matrix multiplication instruction 106). During operation, when deployed in a system, the execution unit may be operative to be coupled with a memory 520. The memory may have stored therein a first source matrix (A) 524, a second source matrix (B) 528, and a source and destination (SRC/DST) accumulation matrix (C) 532. The source and destination accumulation matrix (C) may initially be used as a source operand from which a source accumulation matrix may be read, and then subsequently may be used as a destination operand where a result accumulation matrix may be stored (e.g., the result accumulation matrix may overwrite the source accumulation matrix initially stored in the same storage location).

Each of the matrices has a number of rows (in the vertical direction as shown) and a number of columns (in the horizontal direction as shown). The number of rows or columns may also be referred to by other names in the art, such as, for example, the dimension, size, or order of the matrices. Specifically, the first source matrix (A) has a number of rows (rowsA) and a number of columns (colsA). Likewise, the second source matrix (B) has a number of rows (rows B) and a number of columns (colsB). In matrix multiplication, colsA and rowsB, represent a common, same, or equal dimension of the two matrices. The source and destination accumulation matrix (C) has a number of rows (rowsC) that is the same as the number of rows of the first source matrix (rowsA), and a number of columns (colsC) that is the same as the number of columns of the second source matrix (colsB). That is, the number of rows and columns of the source and destination accumulation matrix (C) may be derivable from the dimensions of the first and second source matrices. Due to these dependencies, various different combinations of dimensions may be used to specify all the needed dimensions of these matrices, and the matrix multiplication instructions disclosed herein may utilize any sufficient combination.

The execution unit 510 may be operative to receive source and result matrices indicators 514. These may be similar to or the same as the indicators 114 previously described. By way of example, the indicators may include memory address information to be used to identify memory locations where the source and destination matrices stored in the memory.

The execution unit 514 may also be operative to receive multiplication matrices dimension indicators 450. As shown in the illustrated embodiment, the multiplication matrices dimension indicators may include three different indicators for three different dimensions sufficient to specify all dimensions of the three matrices. In the illustrated example, these include a number of rows of the first source matrix (A) 547, a number of columns of the first source matrix (A) 548 (which is the same as the number of rows of the second source matrix (B)), and a number of columns of the second source matrix (B) 549. It is to be appreciated that there are other possible ways to indicate the same information, such as, for example, by indicating dimensions of the source and destination accumulation matrix (C) from which certain dimensions of the source matrices can be derived.

The execution unit may also be operative to receive memory layout dimension indicators 452 of potentially/optionally larger matrices respectively having the matrices A, B, and C. These dimensions may either be expressed for column major format, or row major format, as previously described.

As shown, in some embodiments, the execution unit may optionally include tile logic 556. In some embodiments, the tile logic 556 and/or the execution unit 510 and/or a processor having the execution unit, responsive to the matrix multiplication instruction, may be operative to perform tiling. The tiling may broadly represent dividing, partitioning, or otherwise breaking a relatively larger matrix into multiple non-overlapping smaller matrices known as tiles or blocks. By way of example, in some embodiments, the tile logic and/or the execution unit and/or the processor, responsive to the matrix multiplication instruction, may be operative to partition relatively larger source matrices A, B, and C (e.g., dimensioned according to the multiplication matrices dimension indicators 450) into at least one size of relatively smaller tiles.

It may tend to increase efficiency if the majority of the tiles have power-of-two dimensions. The tiles may optionally be made to be square, although this is not required. For example, the relatively larger source matrices may be partitioned along a largest dimension with one dimension made to be a power of two. Generally, the peripheral edges of the relatively larger matrices (and/or relatively larger tiles), namely those portions which are the last to be tiled (or further sub-tiled), may tend to have tiles with dimensions that are not always powers-of-two and/or that may be rectangular not square. This tiling performed responsive to the matrix multiplication instruction may be above and beyond any optional/potential tiling performed by a software algorithm outside of the confines of the execution of the matrix multiplication instruction.

In some embodiments, the tiling may optionally be performed to partition the relatively larger source matrices into at least two different sizes of tiles, although this is not required. For example, first the relatively larger source matrices A, B, and C may be broken into relatively larger tiles, and then the relatively larger tiles may be broken into relatively smaller tiles, and this process may optionally be repeated for still one or more smaller sizes. In some embodiments, there may be two, three, four, five, or even more different levels or sizes of tiles. By way of example, different sizes of tiles may be selected in part based on the different storage capacities of on-die storage structures (e.g., registers, caches, scratchpad memories, dedicated buffers, etc.) used to store the tiles, so that the tiles fit appropriately within these different structures. By way of example, the tile data may be copied from a higher level in the memory hierarchy, then the tile data may be operated on, and then the results may be stored back to the higher level of the memory hierarchy, and this may be performed for each level in the memory hierarchy.

Figure 6:
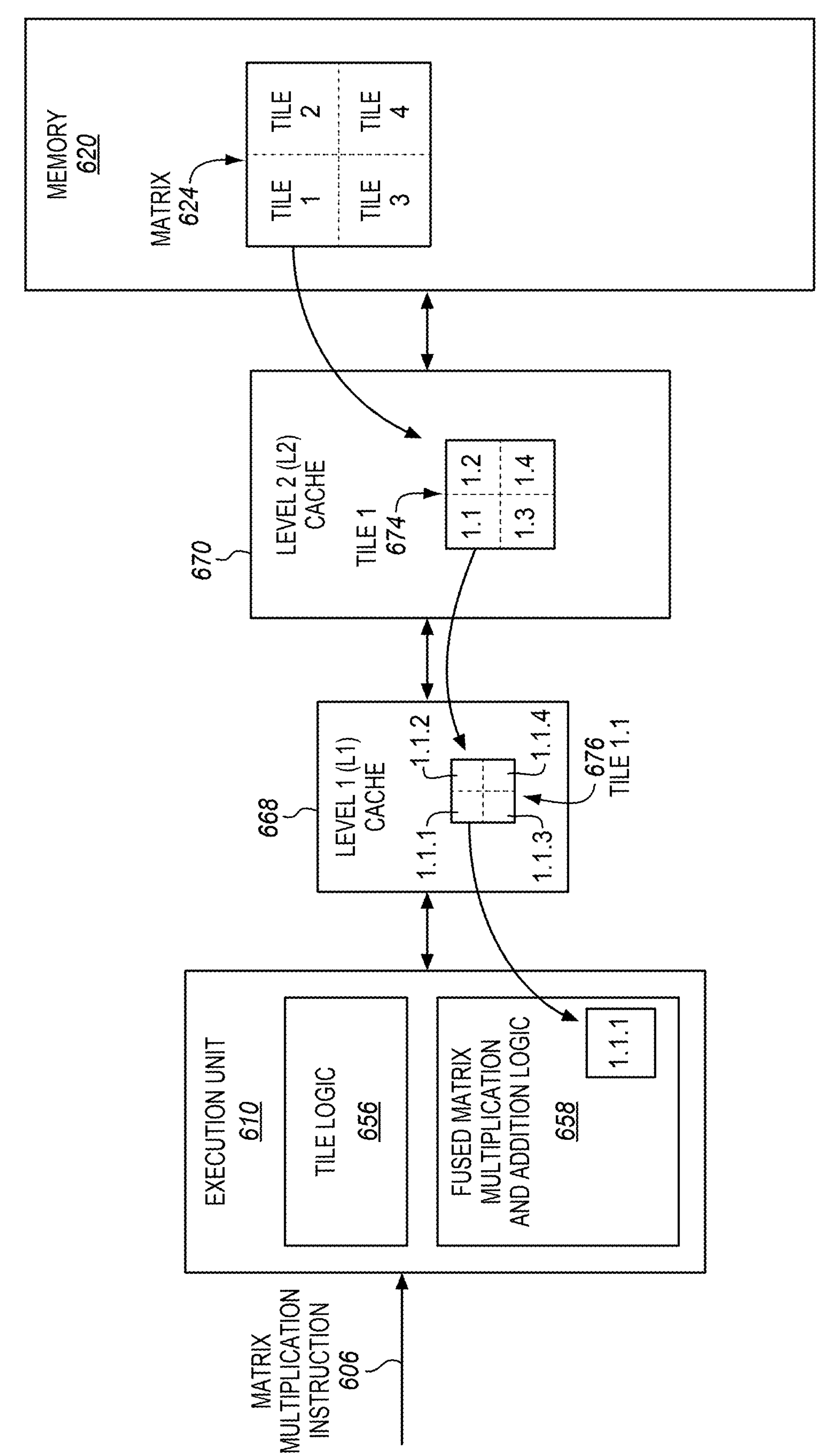
FIG. 6 is a block diagram of one example embodiment of tiling.

To further illustrate certain concepts, FIG. 6 is a block diagram of one example embodiment of tiling. An execution unit 610 may receive a matrix multiplication instruction 606. The execution unit includes tiling logic 656 and a fused multiplication and addition logic 658. A matrix 624 may be stored in a memory 620. The tiling logic may perform tiling on the matrix responsive to the matrix multiplication instruction in order to partition the matrix into four tiles (in this illustrative example), which are labeled tiles "1", "2", "3", and "4". The tile "1" may be accessed and stored in a level 2 (L2) cache 670. The size of the tile "1" may optionally be selected so that tiles of this size are appropriate for the size of the L2 cache (e.g., including any double or triple buffering as will be discussed further below).

The tiling logic may perform further tiling on the tile "1" responsive to the matrix multiplication instruction in order to partition the tile "1" into four additional still smaller tiles (in this illustrative example), which are labeled tiles "1.1", "1.2", "1.3", and "1.4". The tile "1.1" may be stored in a level 1 (L1) cache 668. The size of the tile "1.1" may optionally be selected so that tiles of this size are appropriate for the size of the L1 cache (e.g., including any double or triple buffering as will be discussed further below).

The tiling logic may perform still further tiling on the tile "1.1" responsive to the matrix multiplication instruction to partition the tile "1.1" into four additional still smaller tiles (in this illustrative example), which are labeled tiles "1.1.1", "1.1.2", "1.1.3", and "1.1.4". These smaller tiles may be processed by the fused matrix multiplication and addition logic 658, which may have an array fused multipliers and adders to handle tiles of this size. As shown, the tile "1.1.1" may be provided to the fused matrix multiplication and addition logic. It is to be appreciated that this is just one illustrative example. In other embodiments, matrices and/or tiles may optionally be partitioned in to fewer or more tiles. Also, fewer or more different levels and sizes of tiles may optionally be used.

In some embodiments, tiles may optionally be double buffered or triple buffered within the caches. Double buffering and triple buffering may refer to having two or three copies of the tiles, respectively. For example, in some embodiments, the tiles for the matrices A and B may optionally be double buffered, and the tiles for the matrix C may optionally be double buffered or triple buffered. One copy may be used for the source data to be multiplied (and in some cases accumulated), and another copy may be used to collect arithmetic results.

In this example, caches have been used to store the tiles. In other embodiments, separate or dedicated storage locations may instead optionally be used. For example, one or more levels of scratchpad memory may optionally be used to store these tiles. By way of example, this may be the case when the instruction is performed by a dedicated matrix multiplication accelerator that may not have these existing cache levels.

Referring again to FIG. 5, tiles that are to be arithmetically processed by the execution unit may be provided to fused matrix multiplication and addition logic 558. As one example, the fused matrix multiplication and addition logic may include a two-dimensional array of fused multipliers and adders. By way of example, this may include from 64 to 128 double precision floating point fused multiply-adders, or from 128 to 256 single precision fused multiply-adders, per clock, per CPU core. The fused matrix multiplication and addition logic may perform matrix multiplication, and, in this embodiment, also matrix accumulation. Alternatively, the matrix accumulation may optionally be omitted or turned off (e.g., by not performing the addition, by multiplying the accumulation matrix by a zero coefficient, or the like).

To further illustrate certain concepts, one simple illustrative example of an algorithm that logic 560 of the fused matrix multiplication and addition logic 558 may optionally implement to perform the matrix multiplication with matrix accumulation, may be represented by the following pseudocode:

```
for (i=0; i<rowsA, i++)
  for (j=0; j<colsB; j++)
    for (k=0; k<comm; k++)
      C[i,j] = A[i,k] * B[k,j] + C[i,j]
```

This algorithm includes three nested loops. Specifically, an outer loop with a loop counter "i" is take over all of the rows of the first source matrix (A) (i.e., "rowsA"), a middle loop with a loop counter "j" is taken over all of the columns of the second source matrix (B) (i.e., "colsB"), and a third innermost loop with a loop counter "k" is taken over the common dimension ("comm"). Nested within all of these loops, the multiplication and addition is performed.

It is to be appreciated that this is just one illustrative example of a suitable algorithm. Other algorithms may optionally add additional loops (e.g., for tiles, for multiple levels of tiles of different sizes, etc.). Also, the order of accessing the data may optionally be different than that shown in this algorithm. This may be due in part to the particular way in which tiling is implemented. Often it may be appropriate not to change the order of the innermost "k" loop across the common dimension, since changing its order may tend to slightly modify the final result value due in part to ordering dependencies on floating point rounding. Although, for an implementation where such rounding fluctuations are acceptable, the order of this innermost loop may also optionally be changed, if desired.

If the matrix multiplication instruction completes successfully, the execution unit may be operative to store the resulting matrix in the source/destination accumulation matrix (C) 532. However, if an exception, page fault, or other such exceptional condition or other interruption occurs prior to completion, then a completion progress indictor (CPI) 518 may be stored. The execution unit and/or completion progress indictor calculation logic 562 may be operative to store the completion process indicator. For example, it may optionally be stored in a general-purpose register 512, or in the memory, or in another suitable storage location. The completion progress indictor may optionally be similar to or the same as those described above.

As one specific illustrative example, for the algorithm shown above with the three nested loops, the completion progress indictor logic 562 may include logic 564 to calculate the completion progress indicator (CPI) according to and/or consistent with the following Equation 1:

$$CPI = i * colsB * comm + j * comm + k \quad \text{Equation 1}$$

In this equation, "i" represents the current loop counter taken over the rows of matrix A at the time of the interruption, "j" represents the current loop counter taken over the columns of matrix B (colsB) at the time of the interruption, and "k" represents the current loop counter taken over the common dimension (comm) at the time of the interruption. Different sized sequence numbers may be used in different embodiments. For example, the sequence number may be expressed as a 32-bit, 64-bit, or 128-bit value, to name just a few examples. Generally, 32-bit sequence numbers tend to be appropriate for modest to large sized matrixes, whereas 64-bit sequence may be used for very large matrices (e.g., a two-week long matrix multiplication), and 128-bit sequence numbers may be used for extremely large matrices.

Upon restart, calculations may be resumed at the point where they left off due to the interruption. The completion progress indictor may be used for this purpose. For example, the loop counter values may be restored to the values they had at the time of the interruption by using the completion progress indicator. By way of example, for the completion progress indicator calculated according to Equation 1, the loop counter values i, j, and k may have values consistent with the following Equations 2-4:

$$i = CPI / comm / colsB \quad \text{Equation 2}$$

$$j = (CPI / comm) \% \ colsB \quad \text{Equation 3}$$

$$k = CPI \ \% \ comm \ \% \ colsB \quad \text{Equation 4}$$

In these Equations, the "%" represents a modulo or remainder operator that produces an integer. Another suitable example embodiment of a completion progress indicator is a concatenation of the different loop counter values. Also, they may optionally be stored separately instead of being concatenated but may collectively logically represent yet another example of a completion progress indicator.

After successful completion of the matrix multiplication instruction, the completion progress indicator may have a value consistent with the value calculated according to the following Equation 5:

$$CPI = rowsA * comm * colsB \quad \text{Equation 2}$$

This is just one illustrative example of a suitable completion progress indicator, and way of restarting calculations using this completion progress indicator. In other embodiments, more than three nested loops may optionally be used. In addition, these loops may not walk sequentially. In some embodiments, the execution unit 510 and/or the processor in which it is included may be allowed to read data portions of the A, B, and (for accumulation) C matrices in a different order than the particular order shown in the pseudocode shown above. Also, in some embodiments, data portions of the C matrix may optionally be written in a different order than shown in the pseudocode.

Correspondingly, the execution unit and/or the processor may be allowed to generate and store a completion progress indicator that is based on, and is consistent with, a different equation or approach than the specific illustrative example shown above. The final result matrix may be substantially architecturally defined for the instruction (e.g., possibly allowing for minor variations due to order-dependent floating point rounding). However, the intermediate order of processing the matrix data, and correspondingly the way in which the completion progress indicator is calculated, as well as its value, may not be architecturally defined. Rather, these aspects may be allowed to be flexible. This may allow the particular order and way in which the matrix data is processed (e.g., the particular way in which data is accessed, how tiling is implemented, etc.) to be varied from one implementation to another and/or customized for different design objectives. In some embodiments, the intermediate values of the completion progress indicator may potentially be meaningless to software. In some embodiments, the software may not know how to interpret or use these completion progress indicators to resume the matrix multiplication after an interruption. Rather, the execution unit and/or the processor may be responsible for using such intermediate values of the completion progress indicator.

Similarly, the tiles or intermediate data stored within the processor (e.g., in registers, caches, scratchpad memories, or the like) prior to completion of the instruction may optionally not be architecturally defined and/or understandable by software. Optionally, such tiles or intermediate data may optionally not be saved and restored on context switches and/or after an interruption of the matrix multiplication instruction. Also, in some embodiments, such data may optionally not be snooped (e.g., by other cache coherent agents, other caching agents, other hardware threads or cores, etc.). In some embodiments, loads of matrix data, and stores to matrix data, performed by the matrix multiplication instruction, may only be ordered with respect to preceding and following instructions. Even though the matrix multiplication instruction may be able to read the source operands, and write the destination operand, in a different order than, for example the three nested loops shown in the pseudocode above, normal memory ordering rules should generally apply to the matrix multiplication instruction (e.g., taken as a whole), the preceding instruction in program order, and the subsequent instruction in the program order.

In some embodiments, a matrix multiplication instruction as disclosed herein may optionally support two or more different tiling algorithms, mechanisms, or approaches. For example, these different tiling approaches may different in a number of different sizes of tiles, different tile sizes, or in other aspects related to tiling, or a combination thereof. As one example initially execution of a matrix multiplication instruction may use relatively simpler tiling algorithm, and later the tiling algorithm may evolve or change over time (e.g., to incorporate more sophisticated features, more levels of tiles, etc.). As a result, the tiling aspects associated with the execution of a matrix multiplication instruction may change over time or processor generation. In some embodiments, an execution unit, in addition to storing a completion progress indicator, may also be operative, when there is an interruption, to store an indication of a tiling algorithm that was used. For example, a single bit may be used to differentiate between two different tiling algorithms, or two or more bits may be used to allow possibly more tiling algorithms to be used in the future. The instruction if interrupted may store such an identifier. In some cases, it may either be stored along with the completion progress indicator, such as in a different bit field, or separately from the completion progress indicator (e.g., in another register). Also, in some embodiments, one or more additional bits may also optionally be added each for a different implementation aspect. By way of example, a value having from say four to eight bits may be used to specify a number of different possible implementations which differ in tiling algorithms and/or other ways. This may allow different implementations to be used including for implementations to change over time and for an execution unit to use an indication of a prior implementation when resuming after an interruption. For example, if two implementations are possible, the execution unit may store an indication of which was used, so that the same implementation can be used again upon resuming the interrupted instruction.

In some embodiments, the fused matrix multiplication and addition logic 558 and/or the execution unit 510 may be designed, customized, or optimized to be relatively faster and/or more efficient for a certain size or size range of matrix data (e.g., a certain tile size or range). By way of example, a first implementation may be designed, customized, or optimized for tiles of one size (e.g., 16 rows of matrix A, 16 columns of matrix A, and 16 columns of matrix B) for example with on the order of around 32 to 64 fused multiply add (FMA) clocks. A second implementation may be designed, customized, or optimized for tiles of another size (e.g., 32 rows of matrix A, 32 columns of matrix A, and 32 columns of matrix B) for example with on the order of around 256 to 512 FMA clocks. A third implementation may be designed, customized, or optimized for tiles of yet another size (e.g., 64 rows of matrix A, 64 columns of matrix A, and 64 columns of matrix B), and a fourth implementation for tiles of a still different size (e.g., 128 rows of matrix A, 128 columns of matrix A, and 128 columns of matrix B) for example with on the order of around 16,000 to 32,000 FMA clocks.

In some embodiments, the instruction may implicitly perform arithmetic operations on tiles or data of a fixed size, although this is not required. In other embodiments, the instruction may implicitly perform arithmetic operations on tiles or data of a flexible size, although this is not required. In still other embodiments, both forms may optionally be supported. One possible advantage of using a fixed size, when it is appropriate to do so, is that it may help to improve performance. For example, in the case of a fixed size, this fixed size may be known at the time of instruction fetch and/or decode, instead of only later (e.g., during execution). By knowing this fixed size at around the time of decode, an appropriate number of micro-operations or other operations may be introduced into the pipeline to help reduce the number of bubbles or empty slots in the execution pipeline.

This may help to improve performance. In contrast, if the size was only known later, it may be too late to avoid such bubbles or empty slots in the execution pipeline. In some embodiments, a fixed size form may optionally use an immediate to specify the multiplication matrices dimension indicators (e.g., the multiplication matrices dimension indicators 450). In cases where a compiler can know or learn that such a fixed size is to be used, this form of the instruction may be used and these multiplication matrices dimension indicators may be conveyed through the immediate of the instruction. In other embodiments, when the size is not fixed, or if it is not known whether or not the size is fixed, a flexible size form may be used, and the multiplication matrices dimension indicators may be specified in registers (e.g., general-purpose registers). Such performance improvements generally only tend to be significant for relatively small-sized matrices, since for larger sized matrices the inefficiencies due to initial bubbles are soon eliminated and represent only a small fraction of all the calculations.

In some embodiments, the matrix multiplication instruction when performed may also be operative to cause the execution unit and/or the processor to prefetch matrix data. For example, the matrix data may be prefetched from farther levels of the memory hierarchy to closer levels (e.g., close to a core of the processor). Such data prefetch operations may be overlapped or performed concurrently with the arithmetic operations for the instruction. This may be useful to help ensure that the execution unit has enough data to process. In some embodiments, such prefetch operations may optionally be implemented as prefetch hints that are not architecturally guaranteed to be completed and that the processor may be free to disregard or ignore (e.g., if it thinks it should do something else instead). In some embodiments, an earlier matrix multiplication instruction in program order may be operative to cause matrix data prefetching to prefetch data to be used by a subsequent matrix multiplication instruction.

Certain processors may already have an existing data prefetch unit. In some embodiments, such an existing data prefetch unit may optionally be reused for the matrix multiplication instruction. However, the existing data prefetch unit may be adapted to be aware that it is fetching matrix data, and operative to perform the prefetching accordingly in ways that are appropriate for such matrix data. For example, this may include prefetching based on two dimensional data considerations instead of just one dimensional data considerations, prefetch full tiles or other discrete portions of matrix data, prefetch along tile boundaries, or the like. In other embodiments, an additional or dedicated data prefetch unit or logic may optionally be included, and may be dedicated primarily to the performance of the matrix multiplication instruction. Such a dedicated data prefetch unit or logic may also be aware that it is fetching matrix data, and operative to perform the prefetching accordingly in ways that are appropriate for such matrix data.

While being performed, the matrix multiplication may, in some cases, repeatedly access data from memory. While accessing sequential portions of matrices from memory, a page boundary may be crossed. There either may or may not be a page fault. Commonly, if there is no page fault, full tiles of all the source operands may often be available. However, if there is a page fault, only a partial tile of one of the source operands may be available. Partial tiles may also exist when resuming performing an instruction at an intermediate point where parts of tiles have already been processed and/or along the peripheries of large matrices.

Figure 7:
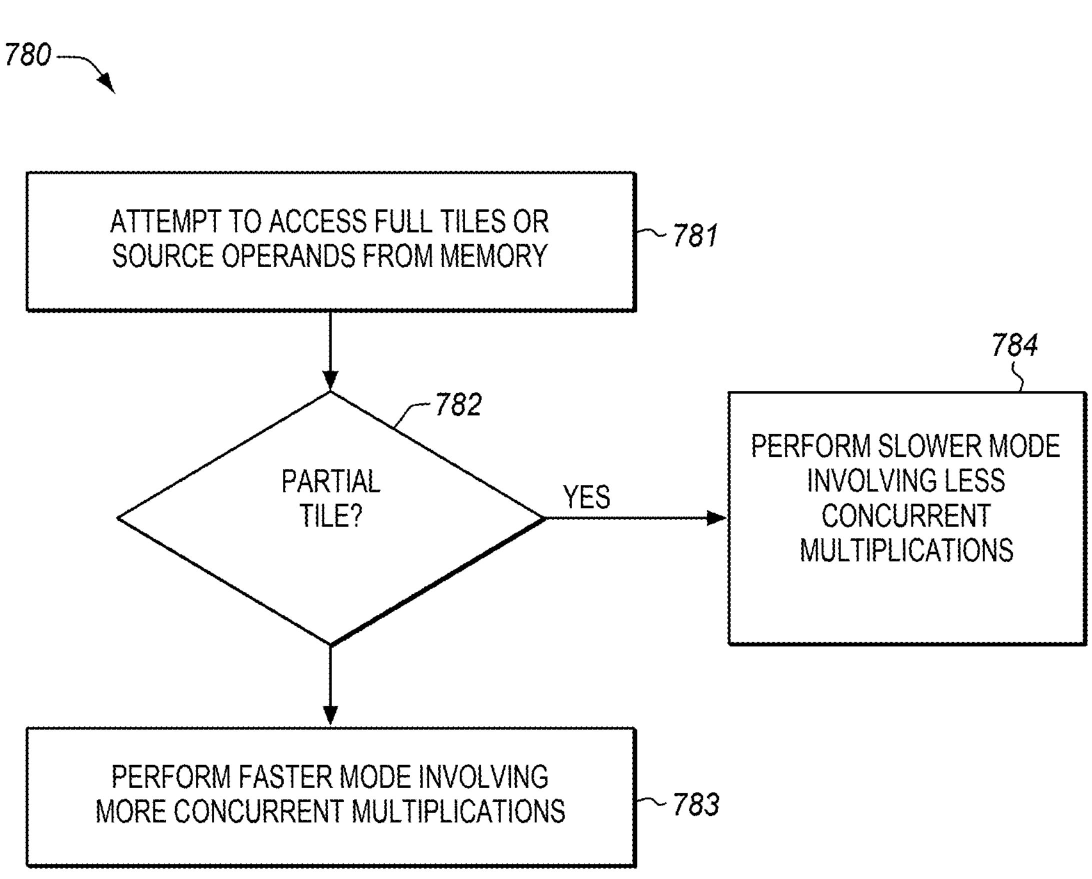
FIG. 7 is a block flow diagram illustrating fast path and slow path processing according to an embodiment.

FIG. 7 is a block flow diagram of an example embodiment of a method 780 of performing matrix multiplication with either a relatively faster mode or a relatively slower mode. The terms faster and slower are relative terms (i.e., relative to each other) not absolute terms. The method includes attempting to access full tiles of source operands from memory, at block 781. At block 782 a determination may be made whether or not only a partial tile is available for at least one of the source operands.

If full tiles are available for all of the source operands (e.g., "no" is the determination), then multiplication may be performed in a relatively faster mode of execution involving relatively more concurrent multiplications per unit time, at block 783. By way of example a vectors or arrays of data elements may be multiplied concurrently. Often, the faster mode is a common case except for page faults, interruptions, and tiles along the peripheries of large matrices.

Alternatively, if only a partial tile is available (e.g., "yes" is the determination), then multiplication may be performed in a relatively slower mode of execution involving relatively less/fewer concurrent multiplications per unit time, at block 784. In some cases, this may involve performing individual element-by-element multiplications, or at least less multiplications concurrently than for the faster mode. Once the partial tile has been completed, execution may generally resume eagerly to the faster mode.

In some embodiments, the execution unit may start the matrix multiplication instruction assuming full tiles are available and performing the faster mode, and may switch to the slower mode (e.g., by causing a micro-exception) if a partial tile is detected. In some embodiments, the execution unit may start the matrix multiplication instruction assuming the completion progress indicator is indicative of the amount of prior progress being none and performing the faster mode, and may switch to the slower mode (e.g., by causing a micro-exception) when the completion progress indicator is to indicate that the amount of prior progress is not none.

Figure 8C:
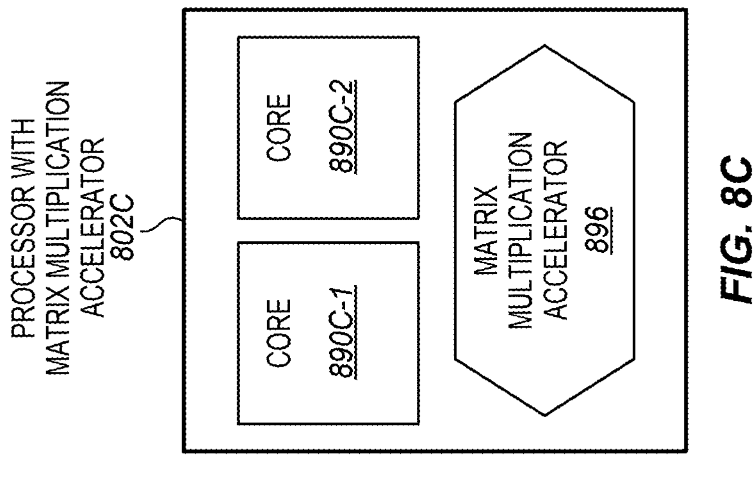
FIGS. 8A-C are block diagrams of three different embodiments processors suitable for performing embodiments of the matrix multiplication instructions as disclosed herein.
Figure 8B:
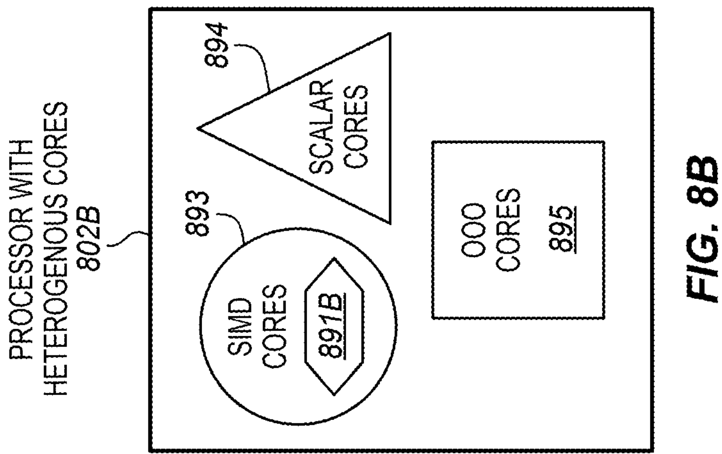
Figure 8A:
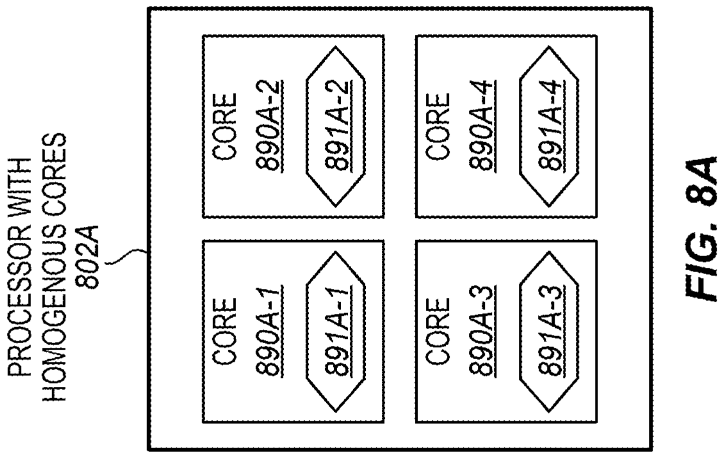

FIGS. 8A-C are block diagrams of three different embodiments processors suitable for performing embodiments of the matrix multiplication instructions as disclosed herein. FIG. 8A shows a first processor 802A that has, in this example four, has homogeneous cores 890A-1 to 890A-4. By way of example, each of these cores may have generally the same architectures, architectural features, and execution resources. In some embodiments, these four cores may each, respectively, include logic 891A-1 to 891A-4 to perform an embodiment of a matrix multiplication as disclosed herein.

FIG. 8B shows a second processor 802B that has, in this example three, mutually heterogeneous cores. Specifically, an in-order SIMD core 893, an in-order scalar core 894, and an out-of-order (OOO) core 895. These cores may be generally heterogeneous in at least some architectural and microarchitectural ways. For example, only the OOO core may have OOO logic, or at least more of it. As another example, the SIMD core may have SIMD execution resources, but the scalar core may not, etc. In some embodiments, one of the cores, for example, the SIMD core 893, may include 891B to perform an embodiment of a matrix multiplication as disclosed herein. The OOO core may alternatively or additionally have such logic.

FIG. 8C shows a third processor 802C that has, in this example two, homogeneous cores 890C-1 to 890C-2. By way of example, each of these cores may have generally the same architectures, architectural features, and execution resources. The third processor also has a matrix multiplication accelerator 896. In some embodiments, the matrix multiplication accelerator may include logic to perform an embodiment of a matrix multiplication as disclosed herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figures 10A, 10B:
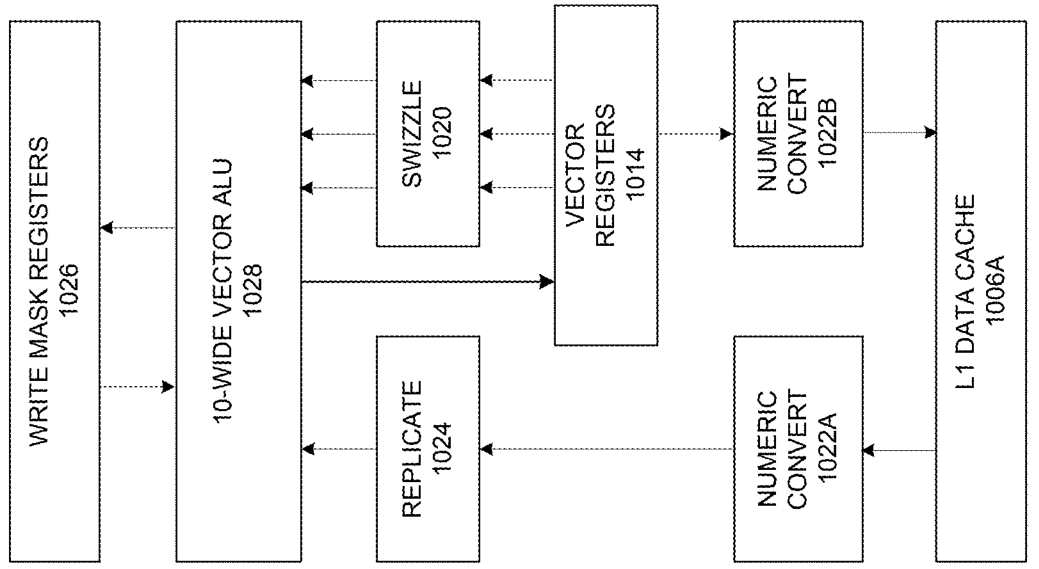
FIG. 10A is a block diagram of an embodiment of a single processor core, along with its connection to the on-die interconnect network, and with its local subset of the Level 2 (L2) cache.
FIG. 10B is a block diagram of an embodiment of an expanded view of part of the processor core of FIG. 10A.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 11012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor With Integrated Memory Controller and Graphics

Figure 11:
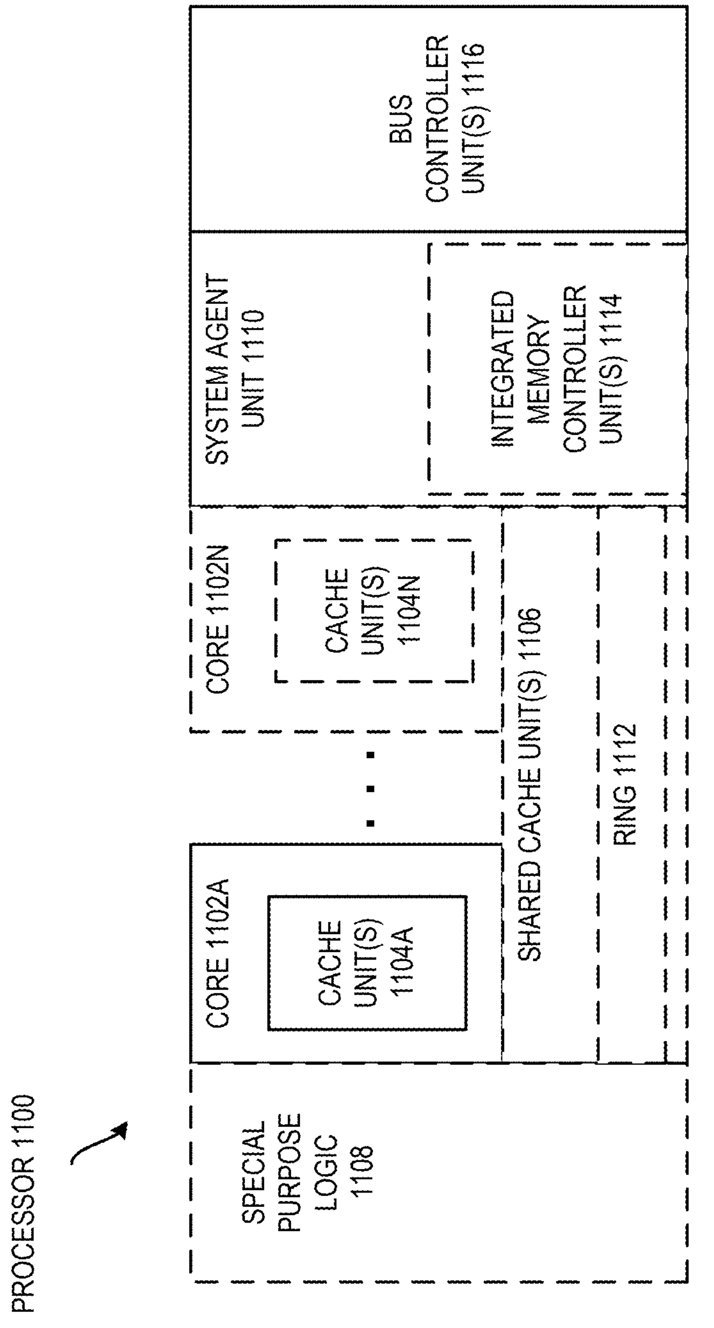
FIG. 11 is a block diagram of an embodiment of a processor that may have more than one core, may have an integrated memory controller, and may have integrated graphics.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
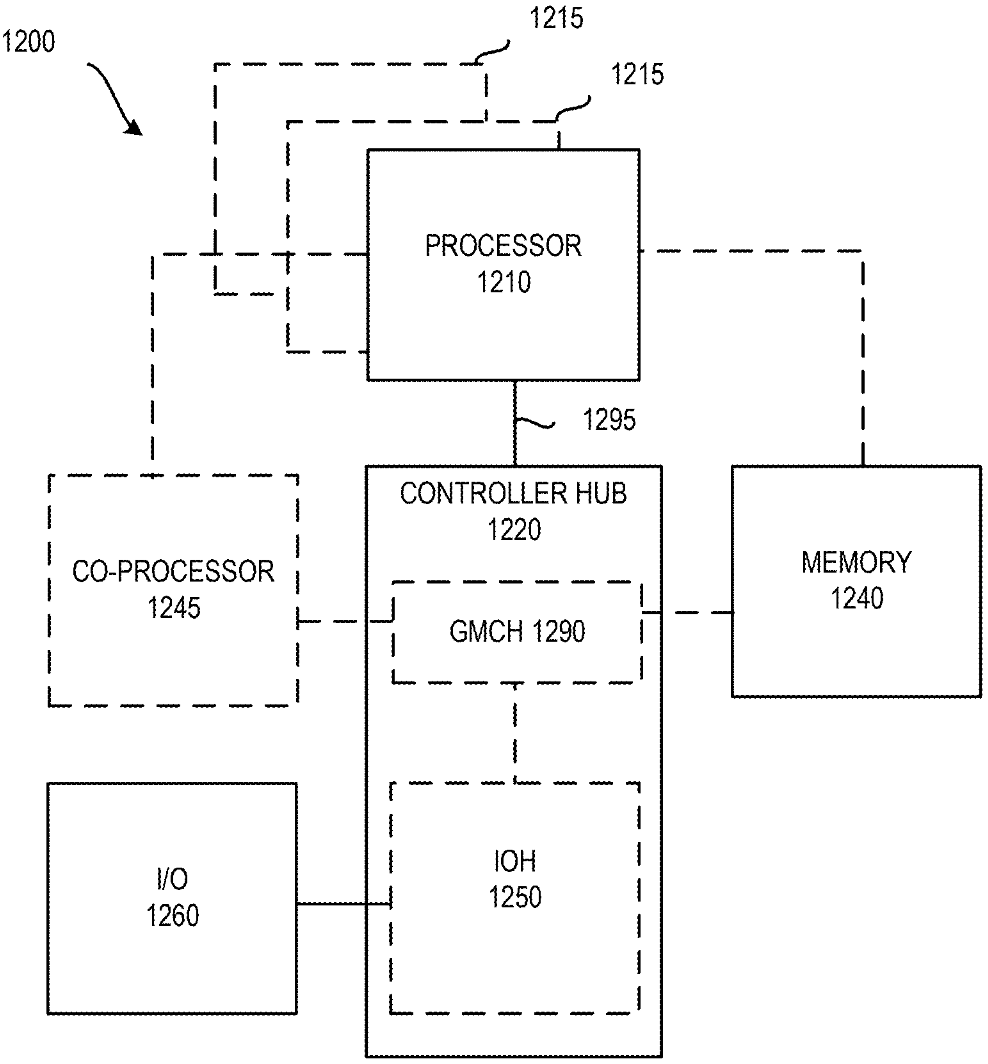
FIG. 12 is a block diagram of a first embodiment of a computer architecture.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
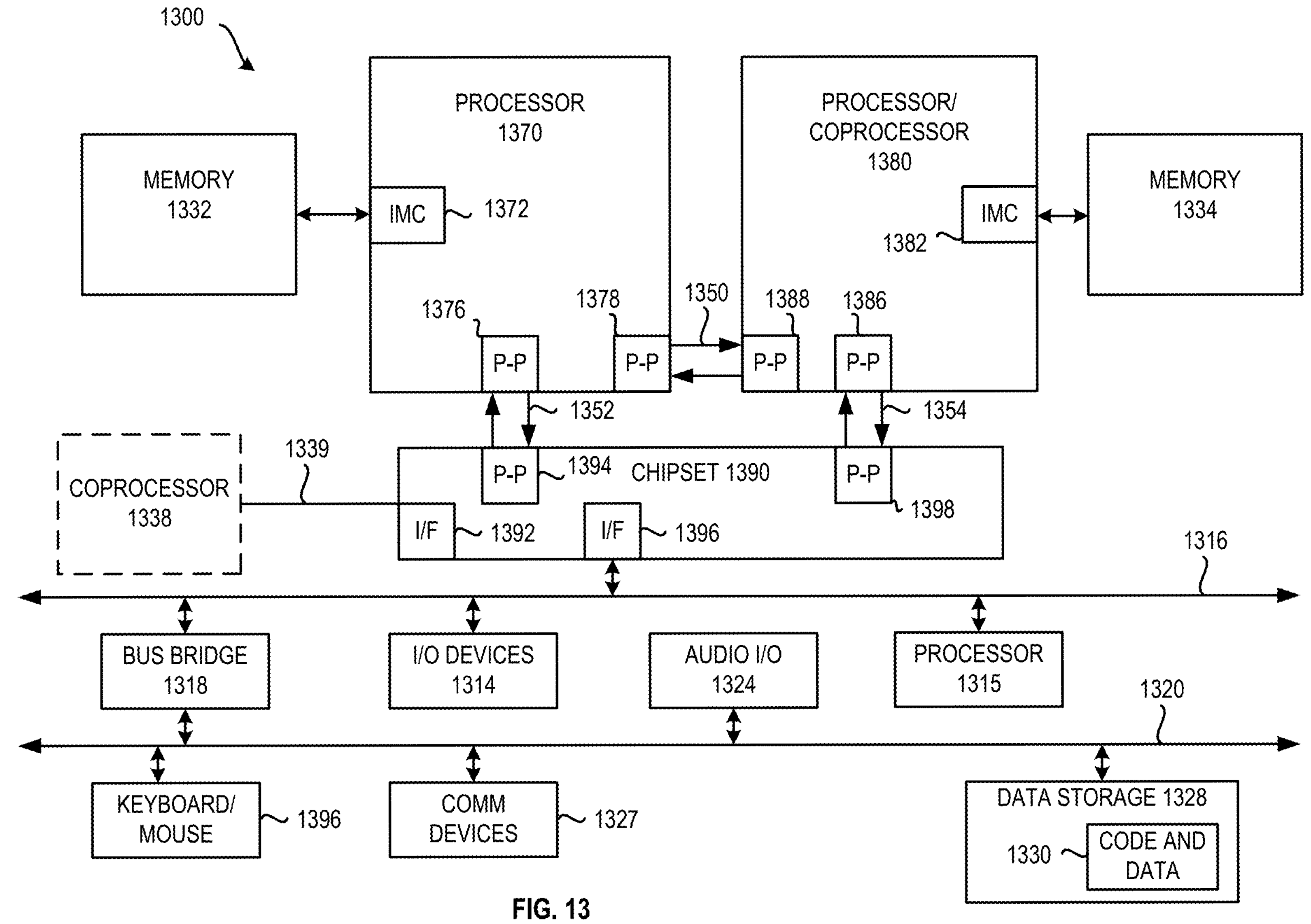
FIG. 13 is a block diagram of a second embodiment of a computer architecture.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
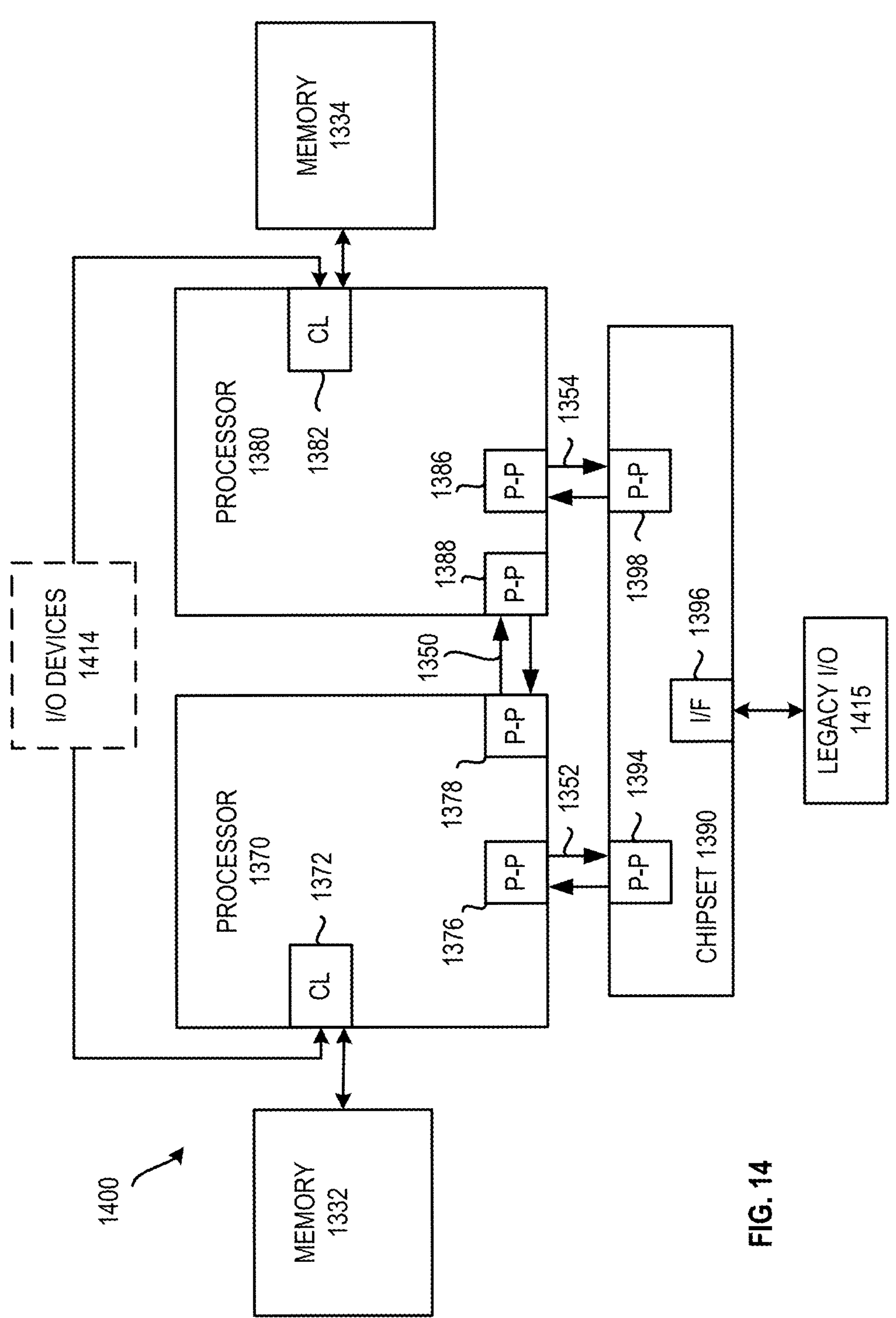
FIG. 14 is a block diagram of a third embodiment of a computer architecture.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
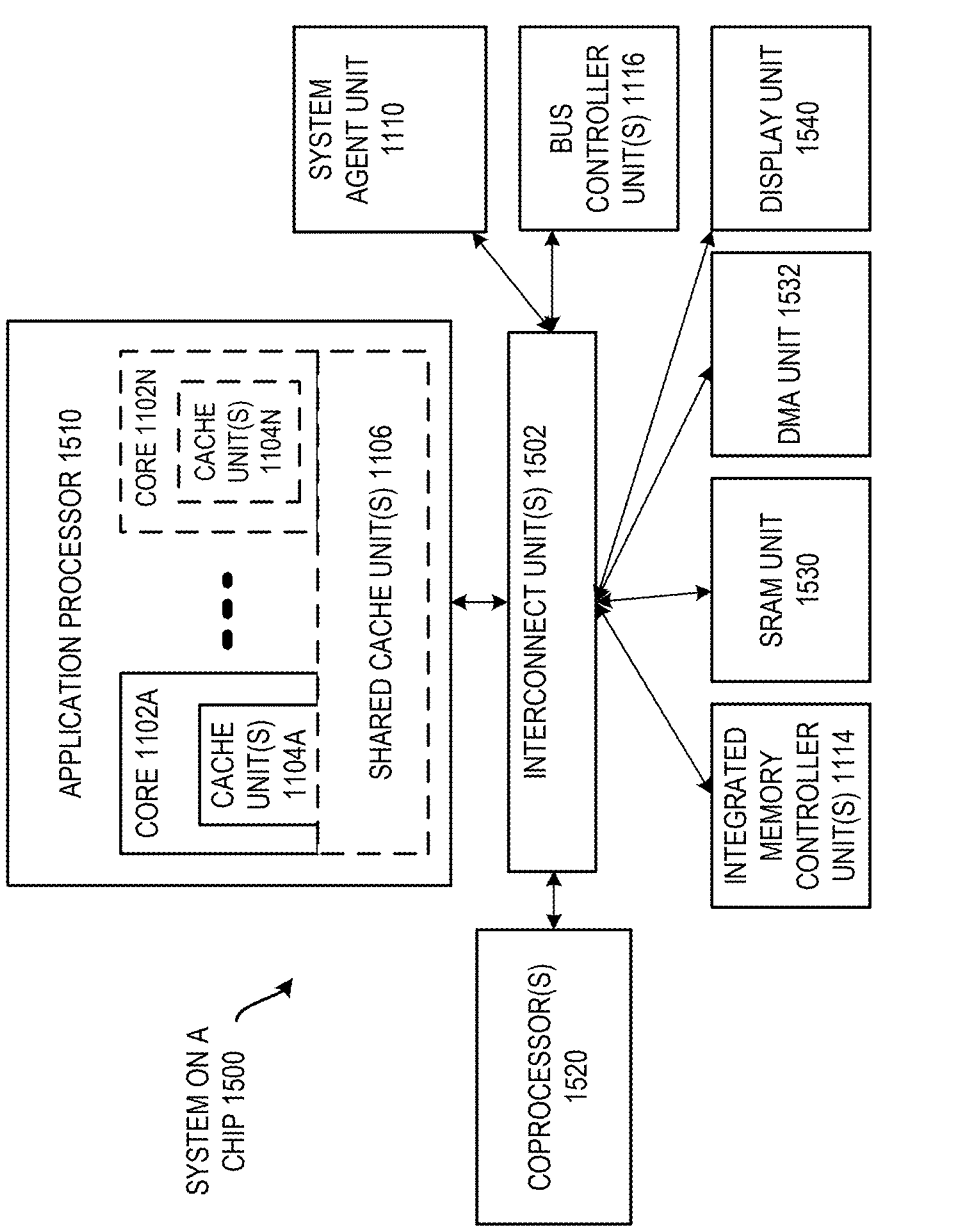
FIG. 15 is a block diagram of a fourth embodiment of a computer architecture.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 142A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor (s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine- readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
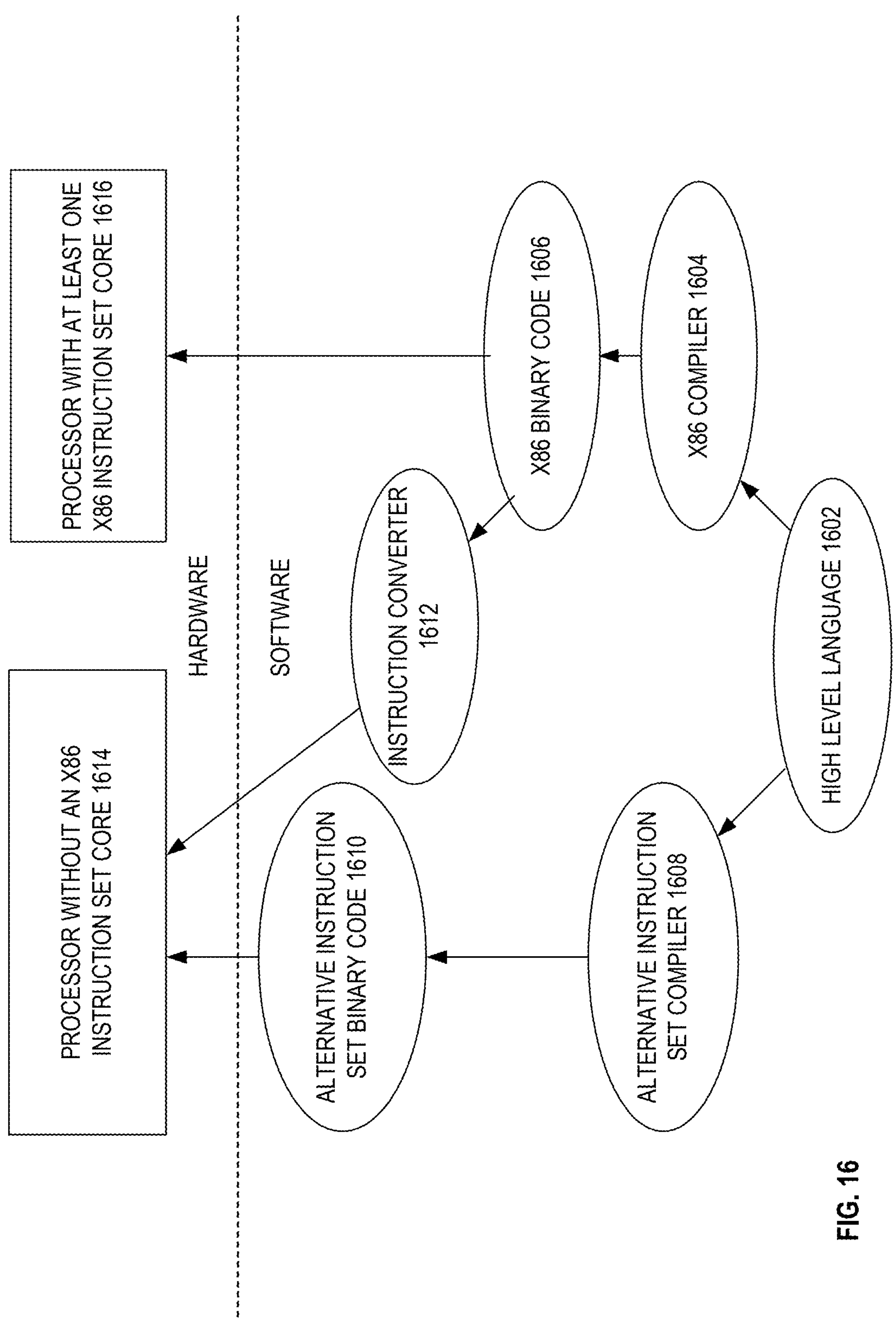
FIG. 16 is a block diagram of use of a software instruction converter to convert binary instructions in a source instruction set to binary instructions in a target instruction set, according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Components, features, and details described for any of the processors disclosed herein may optionally apply to any of the methods disclosed herein, which in embodiments may optionally be performed by and/or with such processors. Any of the processors described herein in embodiments may optionally be included in any of the systems disclosed herein. Any of the instructions disclosed herein in embodiments may optionally be performed by and/or with any of the processors disclosed herein, optionally in some embodiments having any of the microarchitectures shown herein, and optionally in some embodiments included in any of the systems shown herein. Accordingly, features and details described for any of the instructions disclosed herein may in some embodiments therefore optionally apply to any of the processors and/or systems disclosed herein which may be used to perform those instructions.

Processor components disclosed herein may be said to be operative, configured, capable, or able to perform an operation. For example, a decoder may be to decode an instruction, an execution unit may be to store a result, etc. For clarity, it is to be understood that these expressions do not imply that the processor components are in operation or use, but rather refer to what the processor components are capable of doing or able to do when they are in operation, but in the apparatus claims these processor components are not in operation.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The components disclosed herein and the methods depicted in the preceding figures may be implemented with logic, modules, or units that includes hardware (e.g., transistors, gates, circuitry, etc.), firmware (e.g., a non-volatile memory storing microcode or control signals), software (e.g., stored on a non-transitory computer readable storage medium), or a combination thereof. In some embodiments, the logic, modules, or units may include at least some or predominantly a mixture of hardware and/or firmware potentially combined with some optional software.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a tangible and/or non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid-state matter or material, such as, for example, a semiconductor material, a phase change material, a magnetic solid material, a solid data storage material, etc. Alternatively, a non-tangible transitory computer-readable transmission media, such as, for example, an electrical, optical, acoustical or other form of propagated signals—such as carrier waves, infrared signals, and digital signals, may optionally be used.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example 1 is a processor including a decode unit to decode a matrix multiplication instruction. The matrix multiplication instruction to indicate a first memory location of a first source matrix, to indicate a second memory location of a second source matrix, and to indicate a third memory location where a result matrix is to be stored. The processor also includes an execution unit coupled with the decode unit. The execution unit, in response to the matrix multiplication instruction, is to multiply a portion of the first and second source matrices prior to an interruption, and store a completion progress indicator in response to the interruption. The completion progress indicator to indicate an amount of progress in multiplying the first and second source matrices, and storing corresponding result data to the third memory location, that is to have been completed prior to the interruption.

Example 2 includes the processor of Example 1, optionally in which the execution unit, in response to the matrix multiplication instruction, is to store the completion progress indicator which is not to be architecturally defined.

Example 3 includes the processor of Example 1, optionally in which the execution unit, in response to the matrix multiplication instruction, is to store the completion progress indicator which is not to be understandable by software.

Example 4 includes the processor of Example 1, optionally in which the execution unit, in response to the matrix multiplication instruction being resumed after the interruption, is to receive the completion progress indicator, and use the completion progress indicator to resume multiplication of the first and second source matrices without repeating multiplying the portion of the first and second source matrices that had already been multiplied prior to the interruption.

Example 5 includes the processor of Example 1, optionally in which the decode unit is to decode the matrix multiplication instruction that is to indicate matrices dimension indicators.

Example 6 includes the processor of Example 1, optionally in which the decode unit is to decode the matrix multiplication instruction that is to indicate a number of rows of the first source matrix, a number of columns of the second source matrix, and at least one of: (a) a number of columns of the first source matrix; and (b) a number of rows of the second source matrix.

Example 7 includes the processor of Example 6, optionally in which the first source matrix, the second source matrix, and the result matrix are each to be stored in memory in a column major format, and optionally in which the decode unit is to decode the matrix multiplication instruction that is to indicate a distance between columns of a larger matrix that is to include the first source matrix, a distance between columns of a larger matrix that is to include the second source matrix, and a distance between columns of a larger matrix that is to include the result matrix.

Example 8 includes the processor of Example 6, optionally in which the first source matrix, the second source matrix, and the result matrix are each to be stored in memory in a row major format, and optionally in which the decode unit is to decode the matrix multiplication instruction that is to indicate a distance between rows of a larger matrix that is to include the first source matrix, a distance between rows of a larger matrix that is to include the second source matrix, and a distance between rows of a larger matrix that is to include the result matrix.

Example 9 includes the processor of Example 1, optionally in which the execution unit, in response to the matrix multiplication instruction, is to break the first source matrix into a plurality of tiles.

Example 10 includes the processor of Example 9, optionally in which the execution unit, in response to the matrix multiplication instruction, is to break the first source matrix into a plurality of tiles of a first size, and is to break at least one tile of the first size into a plurality of tiles of a second size that is smaller than the first size.

Example 11 includes the processor of Example 9, optionally in which the execution unit, in response to the matrix multiplication instruction, is to store at least two copies of each of the tiles in a cache.

Example 12 includes the processor of Example 11, optionally in which the execution unit, in response to the matrix multiplication instruction, is to break each of the first source matrix, the second source matrix, and an accumulation matrix. Which is initially to be stored in the third memory location, into a plurality of tiles, store two copies of each of the tiles from the first and second source matrices in the cache, and store three copies of each of the tiles from the accumulation matrix in the cache.

Example 13 includes the processor of any one of Examples 1 to 12, in which the execution unit, in response to the matrix multiplication instruction, is to: (1) determine whether a given tile is a full tile or a partial tile; (2) optionally perform relatively more concurrent multiplications when the given tile is the full tile; or (3) optionally perform relatively less concurrent multiplications when the given tile is the partial tile.

Example 14 includes the processor of any one of Examples 1 to 12, in which the execution unit, in response to the matrix multiplication instruction being resumed after the interruption, is to: (1) start to perform the matrix multiplication instruction speculatively with an assumption that the completion progress indicator is indicative of the amount of prior progress being none; and (2) optionally cause a micro-exception or other signal when the completion progress indicator is to indicate that the amount of prior progress is not none.

Example 15 includes the processor of any one of Examples 1 to 12, in which the decode unit is to decode the matrix multiplication instruction that is to have an immediate to indicate a size of each of the first and second source matrices, and optionally in which the processor is to introduce operations into a front end portion of a pipeline of the processor based on the indicated size of each of the first and second source matrices.

Example 16 includes the processor of any one of Examples 1 to 12, in which the execution unit, in response to the matrix multiplication instruction, is to add a portion of an accumulation matrix, which is initially to be stored in the third memory location, to the multiplication of the portion of the first and second source matrices.

Example 17 includes the processor of any one of Examples 1 to 12, further including a general-purpose register, and in which the execution unit, in response to the matrix multiplication instruction, is optionally to store the completion progress indicator in the general-purpose register.

Example 18 is a method performed by a processor including receiving a matrix multiplication instruction at the processor. The matrix multiplication instruction indicating a first memory location of a first source matrix, indicating a second memory location of a second source matrix, and indicating a third memory location where a result matrix is to be stored, multiply a portion of the first and second source matrices, in response to the matrix multiplication instruction, prior to an interruption, and storing a completion progress indicator, in response to the matrix multiplication instruction and the interruption, the completion progress indicator indicating an amount of progress in multiplying the first and second source matrices, and storing corresponding result data to the third memory location, that is to have been completed prior to the interruption.

Example 19 includes the method of Example 18, in which the storing includes storing the completion progress indicator which is to be at least one of not architecturally defined and not understandable by software.

Example 20 includes the method of Example 18, further including, in response to the matrix multiplication instruction being resumed after the interruption: (1) receiving the completion progress indicator; and (2) using the completion progress indicator to resume multiplication of the first and second source matrices without repeating multiplying the portion of the first and second source matrices that had already been multiplied prior to the interruption.

Example 21 includes the method of Example 18, in which the receiving includes receiving the matrix multiplication instruction that is to indicate a number of rows of the first source matrix, optionally a number of columns of the second source matrix, and optionally at least one of: (a) a number of columns of the first source matrix; and (b) a number of rows of the second source matrix.

Example 22 includes the method of Example 18, further including, in response to the matrix multiplication instruction, breaking the first source matrix into a plurality of tiles.

Example 23 includes the method of Example 18, further including, in response to the matrix multiplication instruction being resumed after the interruption: (1) optionally speculatively starting to perform the matrix multiplication instruction assuming the completion progress indicator indicates the amount of prior progress is none; and (2) optionally causing a micro-exception when the completion progress indicator indicates the amount of prior progress is not none.

Example 24 is a computer system including an interconnect, and a processor coupled with the interconnect. The processor to receive a matrix multiplication instruction. The matrix multiplication instruction to indicate a first memory location of a first source matrix, to indicate a second memory location of a second source matrix, and to indicate a third memory location where a result matrix is to be stored. The processor, in response to the matrix multiplication instruction, is to multiply a portion of the first and second source matrices prior to an interruption, and store a completion progress indicator in response to the interruption in an architecturally visible storage location. The completion progress indicator is to indicate an amount of progress in multiplying the first and second source matrices, and storing corresponding result data to the third memory location, that is to have been completed prior to the interruption. The system also includes a dynamic random access memory (DRAM) coupled with the interconnect. The DRAM storing instructions, which other than one or more instances of the matrix multiplication instruction, are not to access or use the completion progress indicator.

Example 25 includes the computer system of Example 24, in which the processor, in response to the matrix multiplication instruction, is to store the completion progress indicator which is not to be architecturally defined.

What is claimed is:

1. An apparatus comprising:

a plurality of cores, each core of the plurality of cores including execution circuitry to execute first instructions of a first instruction set architecture (ISA);

an accelerator coupled to the plurality of cores, the accelerator to execute second instructions of a second ISA to perform matrix multiplication operations with a first source matrix comprising a first plurality of data elements and a second source matrix comprising a second plurality of data elements, wherein the first source matrix comprises a first plurality of matrix tiles and the second source matrix comprises a second plurality of matrix tiles, each matrix tile in the first plurality of matrix tiles comprising a subset of non-overlapping data elements of the first plurality of data elements and each matrix tile in the second plurality of matrix tiles comprising a subset of non-overlapping data elements of the second plurality of data elements, wherein the accelerator supports a predefined set of dimensions for the first plurality of matrix tiles and the second plurality of matrix tiles;

at least one memory coupled to the accelerator to store at least a portion of the subsets of non-overlapping data elements of the first plurality of data elements and the second plurality of data elements; and the accelerator to multiply each matrix tile of the first plurality of matrix tiles with a corresponding matrix tile of the second plurality of matrix tiles to generate a corresponding result matrix tile of a result matrix, the result matrix comprising a plurality of result data elements, the accelerator comprising a two dimensional array of multiplier-adder circuits, wherein responsive to the second instructions, one or more of the multiplier-adder circuits are to perform parallel multiply-accumulate operations with a first matrix tile comprising a first subset of the non-overlapping data elements of the first plurality of data elements and a second matrix tile comprising a second subset of the non-overlapping data elements of the second plurality of data elements, at least one multiplier-adder circuit comprising:

multiplication circuitry to multiply each data element of the first subset of non-overlapping data elements with a corresponding data element of the second subset of non-overlapping data elements to generate a corresponding plurality of products, and adder circuitry to add one or more products of the corresponding plurality of products to a corresponding accumulation data element to generate a corresponding result data element of the plurality of result data elements of the result matrix tile;

wherein when the accelerator is interrupted at a point at which incomplete results of the matrix multiplication operations have been generated, the accelerator is to pause the matrix multiplication operations and maintain the incomplete results, the accelerator to subsequently resume the matrix multiplication operations using the incomplete results from the point at which the incomplete results were generated.

2. The apparatus of claim 1, wherein the corresponding accumulation data element comprises an accumulated value generated by multiplying a third matrix tile comprising a third subset of non-overlapping data elements of the first plurality of data elements and a fourth matrix tile comprising a fourth subset of non-overlapping data elements of the second plurality of data elements.

3. The apparatus of claim 2, wherein the at least one multiplier-adder circuit comprises a first multiplier-adder circuit, the apparatus further comprising: a second multiplier-adder circuit to multiply the third matrix tile and the fourth matrix tile.

4. The apparatus of claim 2, wherein the corresponding plurality of products comprises a first corresponding plurality of products, and wherein the second multiplier-adder circuit further comprises: multiplication circuitry to multiply each data element of the third subset of non-overlapping data elements with a corresponding data element of the fourth subset of non-overlapping data elements to generate a second corresponding plurality of products, and adder circuitry to add two or more products of the second corresponding plurality of products to generate the corresponding accumulation data element.

5. The apparatus of claim 1, wherein the result matrix is to include a number of rows equal to a number of rows of the first source matrix and a number of columns equal to a number of columns of the second source matrix.

6. The apparatus of claim 1, wherein the two dimensional array of multiplier-adder circuits is to perform the parallel multiply-accumulate operations in accordance with at least one instruction having a first field to identify a location of the data elements of the first matrix tile and a second field to identify a location of the data elements of the second matrix tile, and a third field to identify a location of the plurality of result data elements of the result matrix tile.

7. The apparatus of claim 6, wherein the accelerator further comprises: a decoder to decode the at least one instruction to cause the two dimensional array of multiplier-adder circuits to perform the parallel multiply-accumulate operations.

8. The apparatus of claim 7, wherein the decoder is implemented using programmable logic arrays (PLAs) and/or look-up tables.

9. The apparatus of claim 1, wherein the set of dimensions supported by the accelerator comprise power-of-two row and column sizes.

10. The apparatus of claim 9, wherein the set of dimensions supported by the accelerator comprise one or more of: 16 rows, 16 columns, 32 rows, 32 columns, 64 rows, and 64 columns.

11. The apparatus of claim 9, wherein the set of dimensions supported by the accelerator are based on a number of multipliers in the multiplier-adder circuits.

12. The apparatus of claim 1, wherein matrix tiling logic and/or the execution circuitry and/or a processor including the execution circuitry are to partition the first source matrix and the second source matrix into the first plurality of matrix tiles and the second plurality of matrix tiles, respectively.

13. The apparatus of claim 1, wherein the corresponding accumulation data element comprises an accumulated value generated by multiplying a third matrix tile comprising a third subset of non-overlapping data elements of the first plurality of data elements and a fourth matrix tile comprising a fourth subset of non-overlapping data elements of the second plurality of data elements, wherein the result matrix is to include a number of rows equal to a number of rows of the first source matrix and a number of columns equal to a number of columns of the second source matrix, and wherein the two dimensional array of multiplier-adder circuits is to perform the parallel multiply-accumulate operations in accordance with at least one instruction having a first field to identify a location of the data elements of the first matrix tile and a second field to identify a location of the data elements of the second matrix tile, and a third field to identify a location of the plurality of result data elements of the result matrix tile.

14. A method comprising:

executing, by a plurality of cores, first instructions of a first instruction set architecture (ISA);

executing, by an accelerator coupled to the plurality of cores, second instructions of a second ISA to perform matrix multiplication operations with a first source matrix comprising a first plurality of data elements and a second source matrix comprising a second plurality of data elements, wherein the first source matrix comprises a first plurality of matrix tiles and the second source matrix comprises a second plurality of matrix tiles, each matrix tile in the first plurality of matrix tiles comprising a subset of non-overlapping data elements of the first plurality of data elements and each matrix tile in the second plurality of matrix tiles comprising a subset of non-overlapping data elements of the second plurality of data elements, wherein the accelerator supports a predefined set of dimensions for the first plurality of matrix tiles and the second plurality of matrix tiles;

storing, in at least one memory coupled to the accelerator, at least a portion of the subsets of non-overlapping data elements of the first plurality of data elements and the second plurality of data elements;

multiplying, by the accelerator, each matrix tile of the first plurality of matrix tiles with a corresponding matrix tile of the second plurality of matrix tiles to generate a corresponding result matrix tile of a result matrix, the result matrix comprising a plurality of result data elements, the accelerator comprising a two dimensional array of multiplier-adder circuits, wherein responsive to the second instructions, one or more of the multiplier-adder circuits are to perform parallel multiply-accumulate operations with a first matrix tile comprising a first subset of non-overlapping data elements of the first plurality of data elements and a second matrix tile comprising a second subset of non-overlapping data elements of the second plurality of data elements, the at least one multiplier-adder circuit to:

multiply each data element of the first subset of non-overlapping data elements with a corresponding data element of the second subset of non-overlapping data elements to generate a corresponding plurality of products, and add one or more products of the corresponding plurality of products to a corresponding accumulation data element to generate a corresponding result data element of the plurality of result data elements of the result matrix tile;

interrupting the accelerator at a point at which incomplete results of the matrix multiplication operations have been generated;

pausing the matrix multiplication operations and maintaining the incomplete results; and resuming the matrix multiplication operations using the incomplete results from the point at which the incomplete results were generated.

15. The method of claim 14, wherein the corresponding accumulation data element comprises an accumulated value generated by multiplying a third matrix tile comprising a third subset of non-overlapping data elements of the first plurality of data elements and a fourth matrix tile comprising a fourth subset of non-overlapping data elements of the second plurality of data elements.

16. The method of claim 15, wherein the at least one multiplier-adder circuit comprises a first multiplier-adder circuit, the method further comprising: a second multiplier-adder circuit to multiply the third matrix tile and the fourth matrix tile.

17. The method of claim 15, wherein the corresponding plurality of products comprises a first corresponding plurality of products, and wherein the second multiplier-adder circuit further comprises: multiplication circuitry to multiply each data element of the third subset of non-overlapping data elements with a corresponding data element of the fourth subset of non-overlapping data elements to generate a second corresponding plurality of products, and adder circuitry to add two or more products of the second corresponding plurality of products to generate the corresponding accumulation data element.

18. The method of claim 14, wherein the result matrix is to include a number of rows equal to a number of rows of the first source matrix and a number of columns equal to a number of columns of the second source matrix.

19. The method of claim 14, wherein the two dimensional array of multiplier-adder circuits is to perform the parallel multiply-accumulate operations in accordance with at least one instruction having a first field to identify a location of the data elements of the first matrix tile and a second field to identify a location of the data elements of the second matrix tile, and a third field to identify a location of the plurality of result data elements of the result matrix tile.

20. The method of claim 19, wherein the accelerator further comprises: a decoder to decode the at least one instruction to cause the two dimensional array of multiplier-adder circuits to perform the parallel multiply-accumulate operations.

21. The method of claim 14, wherein the set of dimensions supported by the accelerator comprise power-of-two row and column sizes, and wherein the set of dimensions supported by the accelerator comprise one or more of: 16 rows, 16 columns, 32 rows, 32 columns, 64 rows, and 64 columns.

22. The method of claim 14, further comprising partitioning the first source matrix and the second source matrix into the first plurality of matrix tiles and the second plurality of matrix tiles, respectively.

23. The method of claim 14, wherein the corresponding accumulation data element comprises an accumulated value generated by multiplying a third matrix tile comprising a third subset of non-overlapping data elements of the first plurality of data elements and a fourth matrix tile comprising a fourth subset of non-overlapping data elements of the second plurality of data elements, wherein the result matrix includes a number of rows equal to a number of rows of the first source matrix and a number of columns equal to a number of columns of the second source matrix, and wherein the parallel multiply-accumulate operations are performed in accordance with at least one instruction having a first field identifying a location of the data elements of the first matrix tile and a second field identifying a location of the data elements of the second matrix tile, and a third field identifying a location of the plurality of result data elements of the result matrix tile.

24. A non-transitory machine-readable medium having program code stored thereon which, when executed by a machine, causes the machine to perform operations, comprising:

executing, by a plurality of cores, first instructions of a first instruction set architecture (ISA);

executing, by an accelerator coupled to the plurality of cores, second instructions of a second ISA to perform matrix multiplication operations with a first source matrix comprising a first plurality of data elements and a second source matrix comprising a second plurality of data elements, wherein the first source matrix comprises a first plurality of matrix tiles and the second source matrix comprises a second plurality of matrix tiles, each matrix tile in the first plurality of matrix tiles comprising a subset of non-overlapping data elements of the first plurality of data elements and each matrix tile in the second plurality of matrix tiles comprising a subset of non-overlapping data elements of the second plurality of data elements, wherein the accelerator supports a predefined set of dimensions for the first plurality of matrix tiles and the second plurality of matrix tiles;

storing, in at least one memory coupled to the accelerator, at least a portion of the subsets of non-overlapping data elements of the first plurality of data elements and the second plurality of data elements;

multiplying, by the accelerator, each matrix tile of the first plurality of matrix tiles with a corresponding matrix tile of the second plurality of matrix tiles to generate a corresponding result matrix tile of a result matrix, the result matrix comprising a plurality of result data elements, the accelerator comprising a two dimensional array of multiplier-adder circuits, wherein responsive to the second instructions, one or more of the multiplier-adder circuits are to perform parallel multiply-accumulate operations with a first matrix tile comprising a first subset of non-overlapping data elements of the first plurality of data elements and a second matrix tile comprising a second subset of non-overlapping data elements of the second plurality of data elements, the at least one multiplier-adder circuit to:

multiply each data element of the first subset of non-overlapping data elements with a corresponding data element of the second subset of non-overlapping data elements to generate a corresponding plurality of products, and add one or more products of the corresponding plurality of products to a corresponding accumulation data element to generate a corresponding result data element of the plurality of result data elements of the result matrix tile;

interrupting the accelerator at a point at which incomplete results of the matrix multiplication operations have been generated;

pausing the matrix multiplication operations and maintaining the incomplete results; and resuming the matrix multiplication operations using the incomplete results from the point at which the incomplete results were generated.

25. The non-transitory machine-readable medium of claim 24, wherein the corresponding accumulation data element comprises an accumulated value generated by multiplying a third matrix tile comprising a third subset of non-overlapping data elements of the first plurality of data elements and a fourth matrix tile comprising a fourth subset of non-overlapping data elements of the second plurality of data elements.

26. The non-transitory machine-readable medium of claim 25, wherein the corresponding plurality of products comprises a first corresponding plurality of products, and wherein a second multiplier-adder circuit further comprises: multiplication circuitry to multiply each data element of the third subset of non-overlapping data elements with a corresponding data element of the fourth subset of non-overlapping data elements to generate a second corresponding plurality of products, and adder circuitry to add two or more products of the second corresponding plurality of products to generate the corresponding accumulation data element.

27. The non-transitory machine-readable medium of claim 24, wherein the set of dimensions supported by the accelerator comprise one or more of: 16 rows, 16 columns, 32 rows, 32 columns, 64 rows, and 64 columns.

28. The non-transitory machine-readable medium of claim 24, further comprising partitioning the first source matrix and the second source matrix into the first plurality of matrix tiles and the second plurality of matrix tiles, respectively.

* * * * *